United States Patent
Samukawa et al.

(10) Patent No.: US 9,205,526 B2
(45) Date of Patent: Dec. 8, 2015

(54) EDGING SYSTEM OF SPECTACLE LENS, METHOD FOR MANUFACTURING SPECTACLE LENS, AND LENS EDGER

(71) Applicant: HOYA CORPORATION, Tokyo (JP)

(72) Inventors: Masahiko Samukawa, Akishima (JP); Takashi Daimaru, Akiruno (JP); Ryosuke Sato, Koganei (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 14/363,985

(22) PCT Filed: Dec. 6, 2012

(86) PCT No.: PCT/JP2012/081703
§ 371 (c)(1),
(2) Date: Jun. 9, 2014

(87) PCT Pub. No.: WO2013/085010
PCT Pub. Date: Jun. 13, 2013

(65) Prior Publication Data
US 2014/0302749 A1    Oct. 9, 2014

(30) Foreign Application Priority Data

Dec. 8, 2011 (JP) ................................. 2011-269184
Sep. 28, 2012 (JP) ................................. 2012-216302

(51) Int. Cl.
*B24B 9/14* (2006.01)
*G05B 19/19* (2006.01)

(52) U.S. Cl.
CPC ............... *B24B 9/148* (2013.01); *G05B 19/19* (2013.01)

(58) Field of Classification Search
CPC ........ B24B 9/14; B24B 9/148; B24B 13/005; B24B 9/146; B24B 49/02; B24B 37/042; B24B 1/00; B24B 7/228; B24B 21/04; B24B 27/0076
USPC .......... 451/5, 6, 41, 43, 57; 700/98, 103, 117; 33/554, 555.1, 561
See application file for complete search history.

(56) References Cited

U.S. PATENT DOCUMENTS 4,817,024 A * 3/1989 Saigoh .............................. 703/1
5,450,335 A * 9/1995 Kikuchi ........................ 702/168
(Continued)

FOREIGN PATENT DOCUMENTS

EP    0 061 918 A1    10/1982
JP    A-57-158829    9/1982
(Continued)

OTHER PUBLICATIONS

International Search Report issued in International Application No. PCT/JP2012/081703 on Mar. 12, 2013 (with translation).
(Continued)

*Primary Examiner* — George Nguyen
(74) *Attorney, Agent, or Firm* — Oliff PLC

(57) ABSTRACT

In a lens edging system using a lens edger 22 and an edging control terminal 23, the lens edger 22 includes a calculation switching section 22 configured to switch a setting of a calculating section so as to select either one of a first calculating section 22d and a second calculating section 23b for calculating edging shape data, and a data acquisition section 22f configured to acquire the edging shape data calculated by the second calculating section 23b from the edging control terminal 23, wherein when the calculation switching section 22g switches the setting of a calculating section so as to select the second calculating section 23b for calculating the edging shape data, the edging shape data calculated by the second calculating section 23b is acquired by a data acquisition section 22f, and a lens edging section 22a performs edging using the acquired edging shape data.

14 Claims, 10 Drawing Sheets

(56) References Cited

U.S. PATENT DOCUMENTS

| | | | | |
|---|---|---|---|---|
| 6,749,377 | B2* | 6/2004 | Gottschald et al. | 409/132 |
| 7,448,938 | B2* | 11/2008 | Inoguchi | 451/5 |
| 8,216,024 | B2* | 7/2012 | Hamanaka et al. | 451/5 |
| 8,295,961 | B2* | 10/2012 | Daimaru et al. | 700/98 |
| 8,388,133 | B2* | 3/2013 | Freson et al. | 351/178 |
| 2002/0160690 | A1* | 10/2002 | Miyazawa et al. | 451/5 |
| 2003/0227690 | A1* | 12/2003 | Jinbo et al. | 359/643 |
| 2009/0067940 | A1* | 3/2009 | Arai et al. | 408/22 |
| 2010/0293069 | A1* | 11/2010 | Freson et al. | 705/26 |
| 2014/0302749 | A1* | 10/2014 | Samukawa et al. | 451/5 |

FOREIGN PATENT DOCUMENTS

| | | |
|---|---|---|
| JP | A-4-13539 | 1/1992 |
| JP | A-8-290348 | 11/1996 |
| JP | B2-3075870 | 8/2000 |
| JP | A-2003-231001 | 8/2003 |
| JP | A-2003-287724 | 10/2003 |
| JP | B2-4151774 | 9/2008 |
| WO | WO 2007/077848 A1 | 7/2007 |

OTHER PUBLICATIONS

International Preliminary Report on Patentability issued in International Application No. PCT/JP2012/081703 on Jun. 10, 2014 (with translation).

Aug. 4, 2015 Search Report issued in European Patent Application No. 12854915.1.

* cited by examiner

FIG. 3
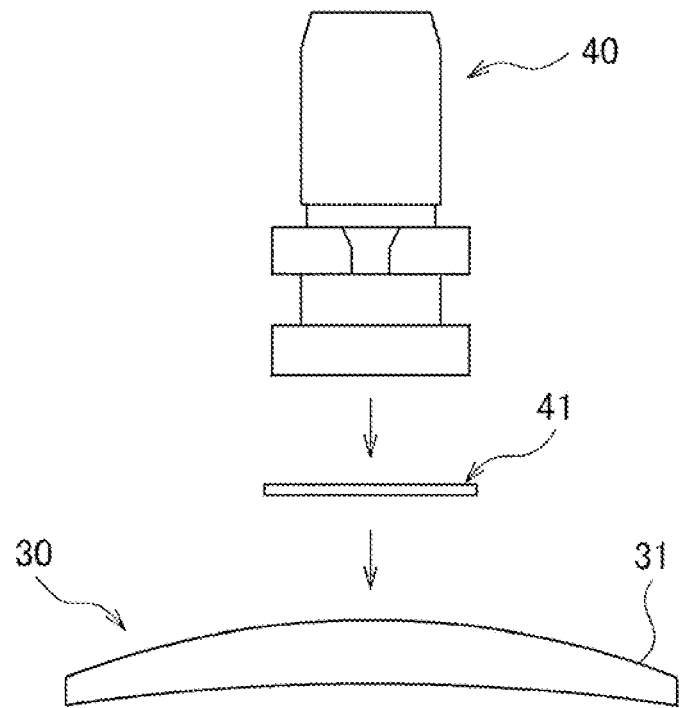
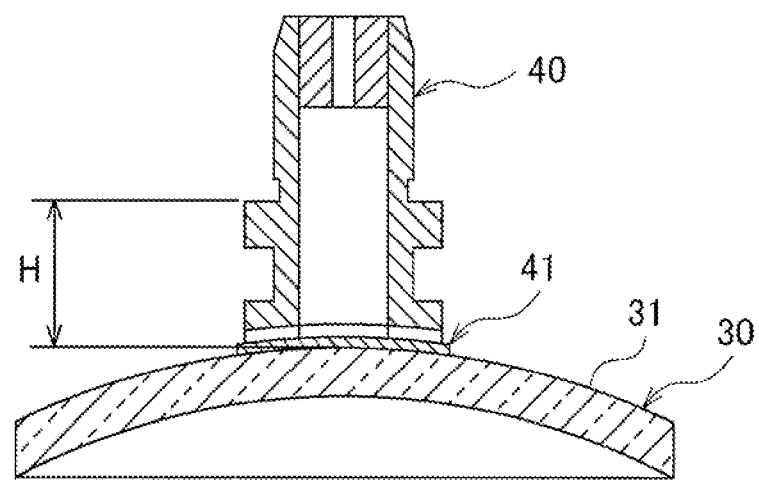

EDGING SYSTEM OF SPECTACLE LENS, METHOD FOR MANUFACTURING SPECTACLE LENS, AND LENS EDGER

TECHNICAL FIELD

The present invention relates to a lens edging system of a spectacle lens, a method for edging a spectacle lens, and a lens edger, which edges a spectacle lens for settling the lens in a spectacle frame.

DESCRIPTION OF RELATED ART

In a spectacle shop, etc., edging is applied to a spectacle lens desired by a spectacle orderer from a product group of the spectacle lens that complies with prescription information of the spectacle orderer (client), for settling the lens in a spectacle frame selected by the spectacle orderer. In such an edging, the spectacle lens is edged so as to comply with the frame shape data of the spectacle frame obtained by a measurement using a tracer, the kind, material, and a beveling form of the spectacle frame, etc.

A lens edger is used for edging the spectacle lens. The lens edger calculates edging shape data based on a specific calculation program, so that the spectacle lens is edged by using the calculated edging shape data. The edging shape data is the data for specifying in what shape the spectacle lens, being an edged object, should be edged.

When the spectacle lens is edged, the edging shape data is calculated using data (also called "order reception data" generally hereafter) including spectacle frame information, spectacle lens information, layout information, and prescription information, etc. Regarding edging of the spectacle lens and a lens edger, for example, the technique described in patent documents 1 and 2 is used.

Further, in an intensive edging system for integrating and streamlining an edging source such as a lens edger, a plurality of lens edgers are installed in an edging center, and the spectacle lens is intensively edged there (see patent document 3). In such an intensive edging system, a tracer is installed in each spectacle shop, and the spectacle lens is edged by providing (sending) the frame shape data of the spectacle frame measured by the tracer, to the lens edger of the edging center, together with spectacle frame information.

However, in the intensive edging system, the spectacle frame is not kept at an edging center side, and therefore there is a problem that an order receiving side (edging center) cannot confirm whether or not the spectacle lens edged by the lens edger can be normally settled in the spectacle frame specified by an ordering side (spectacle shop).

Therefore, an applicant of the present application already proposes and practicalizes an lens edging system (called "just fit edging system" hereafter) that contributes to an improvement of a fitting rate for settling a lens in a spectacle frame, which is different from the abovementioned intensive edging system (see patent document 4). In such a just fit edging system, an edging control terminal and a plurality of lens edgers are installed in the edging center, and the frame shape data of the spectacle frame measured by the tracer of the spectacle shop, is provided (sent) to the edging control terminal of the edging center, together with the spectacle frame information. Then, calculation is performed at the edging control terminal, regarding edging shape data and a theoretical circumference of the spectacle lens used for edging, using lens design data of the spectacle lens, which is required for optimizing the settling of the lens in a spectacle frame, other than the data received from the ordering side. Meanwhile, at the lens edger side, edging is applied to the spectacle lens based on the edging shape data calculated by the edging control terminal. Further, the circumference of the edged spectacle lens is measured by a three-dimensional circumference measuring machine, and by comparing an actually measured circumference obtained by this measurement, and the theoretical circumference calculated by the edging control terminal, whether or not the spectacle lens can be normally settled in the spectacle frame, is confirmed (inspected).

PRIOR ART DOCUMENT

Patent Document

Patent document 1: Patent Publication No. 4151774
Patent document 2: Japanese Patent Laid Open Publication No. 2003-231001
Patent document 3: Japanese Patent Laid Open Publication No. 1992-13539
Patent document 4: Patent Publication No. 3075870

SUMMARY OF THE INVENTION

Problem to be Solved by the Invention

Incidentally, the calculation program used for the lens edger having a calculation function of calculating the edging shape data, is prepared for every lens edger maker. Therefore, even in a case of using the same order reception data, the edging shape data is calculated using a different calculation program for every lens edger maker. Accordingly, even if the same spectacle lens is edged by the lens edger produced by A-corporation and the lens edger produced by B-corporation, a slight difference is generated in a finished shape of the spectacle lens obtained by each of the lens edgers. The reason is as follows.

Namely, even if the frame shape data of the spectacle frame measured by the tracer is the same data, a reference (ideal) shape of a finished spectacle lens based on the frame shape data, is different depending on each maker. Also, which lens shape is selected to be ideal by a lens maker or an edger maker, and which calculation program is used for obtaining the ideal shape by a lens maker or an edger maker, are managed as a knowhow of each maker. Therefore, for example as described in patent document 3, even when a measurement error specific to the tracer and the edging error specific to the lens edger are stored in a memory and the frame shape data of the spectacle frame measured by the tracer is corrected using an error amount read from the memory, the finished shape of the spectacle lens is different if the reference lens shape of each maker is different. Further, patent document 3 discloses a spectacle lens edging system in which the tracer is installed in each of a plurality of spectacle shops and the lens edger is disposed in one edging center, and they are connected to a computer by a public communication line, so that edging is applied to the spectacle lens. However, there is no disclosure in this document, regarding the edging shape data by the lens edger and a difference in the finished shape of the spectacle lens.

Meanwhile, the abovementioned just fit edging system is used, which is constructed in the edging center of its own company of the lens maker who keeps the lens design data. However, in recent years, with a progress of globalization of a manufacturing base, it is efficient to introduce and use the lens edger that can be available in each country, from a human and financial viewpoint. Therefore, it can be considered that the lens maker who uses the just fit edging system replaces the maker's own lens edger by other maker's lens edger. However, the lens edger provided (manufactured) by a lens edger maker other than the lens maker is configured to calculate the edging shape data based on the calculation program that complies with a standard which is uniquely defined by this lens edger maker. Therefore, if the lens maker using the just fit edging system, replaces the maker's own lens edger by other maker's lens edger, difference is generated in the finished shape of the spectacle lens due to a difference of the lens edger maker.

A main object of the present invention is to provide a technique of edging the spectacle lens in a desired finished shape, irrespective of the difference of the lens edger maker, when the spectacle lens is edged.

Means for Solving the Problem (First Aspect)

A first aspect of the present invention provides a lens edging system of a spectacle lens which edges a spectacle lens for settling a lens in a spectacle frame, including:

a lens edger having a lens edging section to perform edging, and a first calculating section to obtain edging shape data used for edging by the lens edging section, based on a first calculation program; and an edging control terminal having a second calculating section to obtain edging shape data used for edging by the lens edging section, based on a second calculation program different from the first calculation program, wherein the lens edger includes a calculation switching section configured to switch a setting of a calculating section so as to select either one of the first calculating section and the second calculating section for calculating edging shape data used for at least the edging in each kind of calculation items regarding the edging, and a data acquisition section configured to acquire edging shape data calculated by the second calculating section from the edging control terminal when the edging shape data is calculated by the second calculating section, wherein when the calculation switching section switches the setting of the calculating section so as to select the second calculating section for calculating the edging shape data, the edging shape data calculated by the second calculating section is acquired by the data acquisition section, and the spectacle lens is edged into a desired finish shape, irrespective of a maker or a model of the lens edger, by acquiring the edging shape data by the data acquisition section, the edging shape data being calculated by the second calculating section, and performing edging by the lens edging section using the acquired edging shape data.

(Second Aspect)

A second aspect of the present invention provides the edging system of a spectacle lens according to the first aspect, wherein the lens edging section performs the edging by rough edging and finish edging, and the first calculating section calculates edging shape data used for the rough edging and the finish edging without using lens design data of the spectacle lens, and the second calculating section calculates edging shape data used for at least the finish edging out of the rough edging and the finish edging, using the lens design data of the spectacle lens.

(Third Aspect)

A third aspect of the present invention provides the edging system of a spectacle lens according to the first or second aspect, wherein the lens edger includes an edge shape measurement section for measuring an edge shape of the spectacle lens, and is configured to output edge shape measurement data obtained by a measurement by the edge shape measurement section to the edging control terminal, and the second calculating section of the edging control terminal is configured to calculate the edging shape data using the edge shape measurement data outputted from the lens edger.

(Fourth Aspect

A fourth aspect of the present invention provides the edging system of a spectacle lens according to any one of the first to third aspects, wherein the lens edger is configured to output edger information to the edging control terminal, as one of the calculating information used for calculating the edging shape data, and the edging control terminal has a calculating information acquisition section that acquires the edger information outputted from the lens edger as one of the calculating information.

(Fifth Aspect)

A fifth aspect of the present invention provides the edging system of a spectacle lens according to the third aspect, wherein the second calculating section of the edging control terminal is configured to calculate shape data for measuring an edge shape using lens design data of a spectacle lens to be edged, when the calculation switching section switches a setting of a calculating section so as to select the second calculating section for calculating the edging shape data, and the lens edger is configured to acquire the shape data for measuring the edge shape calculated by the second calculating section when the calculation switching section switches a setting of a calculating section so as to select the second calculating section for calculating the edging shape data, and measure an edge shape by the edge shape measurement section using the acquired shape data for measuring the edge shape.

(Sixth Aspect)

A sixth aspect of the present invention provides the edging system of a spectacle lens according to the third aspect, including a blocker for mounting a lens holder on the spectacle lens so that the spectacle lens is held by the lens holder, wherein the lens edger outputs central height data showing a central height at the time of holding the spectacle lens by the lens holder, to the edging control terminal together with the edge shape measurement data.

(Seventh Aspect)

A seventh aspect of the present invention provides the edging system of a spectacle lens according to any one of the first to sixth aspects, wherein the lens edger has an operation panel for an operator to select either one of the first calculating section and the second calculating section for calculating the edging shape data, and the calculation switching section is configured to switch setting of the calculating section so as to select either one of the first calculating section and the second calculating section for calculating the edging shape data, based on a result selected by the operator using the operation panel.

(Eighth Aspect)

An eight aspect of the present invention provides the edging system of a spectacle lens according to any one of the first to sixth aspects, wherein the calculation switching section is configured to switch a setting of a calculating section so as to select either one of the first calculating section and the second calculating section for calculating the edging shape data using at least one of spectacle lens information, spectacle frame information, and prescription information included in order reception data which is used for edging.

(Ninth Aspect)

A ninth aspect of the present invention provides the edging system of a spectacle lens according to any one of the first to sixth aspects, wherein the edging control terminal is configured to output a command signal to the lens edger, for giving an instruction to select either one of the first calculating section and the second calculating section for calculating the edging shape data, and the calculation switching section of the lens edger is configured to switch the calculating section so as to select either one of the first calculating section and the second calculating section for calculating the edging shape data, based on the command signal outputted from the edging control terminal.

(Tenth Aspect)

A tenth aspect of the present invention provides the edging system of a spectacle lens according to the ninth aspect, wherein the edging control terminal is configured to output a command signal to give an instruction to calculate the edging shape data by the first calculating section when lens design data of a spectacle lens to be edged cannot be acquired, and give an instruction to calculate the edging shape data by the second calculating section when the lens design data can be acquired.

(Eleventh Aspect)

An eleventh aspect of the present invention provides the edging system of a spectacle lens according to the ninth aspect, wherein the edging control terminal is configured to output a command signal to give an instruction to calculate the edging shape data by the first calculating section when a surface shape of a spectacle lens to be edged is a spherical surface, and give an instruction to calculate the edging shape data by the second calculating section when the surface shape of the spectacle lens is the shape other than the spherical surface.

(Twelfth Aspect)

A twelfth aspect of the present invention provides the edging system of a spectacle lens according to claim 9, wherein the edging control terminal is configured to output a command signal to give an instruction to calculate the edging shape data by the first calculating section when a tilt angle of a spectacle frame in which a lens is settled, is less than a specific angle, and give an instruction to calculate the edging shape data by the second calculating section when a tilt angle of the spectacle frame is the specific angle or more.

(Thirteenth Aspect)

A thirteenth aspect of the present invention provides a method for manufacturing a spectacle lens, using a lens edger having a lens edging section that edges a spectacle lens so as to be settled in a spectacle frame, and a first calculating section that obtains edging shape data used for edging the lens by the lens edging section, based on a first calculation program; and an edging control terminal having a second calculating section that obtains edging shape data used for edging the lens by the lens edging section, based on a second calculation program different from the first calculation program, the method including:

switching a setting of a calculating section so as to select either one of the first calculating section and the second calculating section for calculating edging shape data used for at least the edging of the lens in each kind of calculation items regarding the edging by the lens edger;

calculating the edging shape data by the second calculating section when the setting of the calculating section is switched in the step of switching a setting so as to select the second calculating section for calculating the edging shape data; and edging the spectacle lens by the lens edging section of the lens edger using the edging shape data calculated by the second calculating section in the step of calculating the edging shape data.

(Fourteenth Aspect)

A fourteenth aspect of the present invention provides a lens edger communicably connected to an edging control terminal having a second calculating section for obtaining edging shape data used for edging based on a second program, and configured to edge a spectacle lens so as to be settled in a spectacle frame, the lens edger including:

a lens edging section configured to perform the edging;

a first calculating section configured to obtain edging shape data used for the edging by the lens edging section, based on a first calculation program different from the second calculation program;

a calculation switching section configured to switch a setting of a calculating section so as to select either one of the first calculating section and the second calculating section for calculating the edging shape data used for at least the edging in each kind of calculation items regarding the edging;

a data acquisition section configured to acquire the edging shape data calculated by the second calculating section when the edging shape data is calculated by the second calculating section; and an edging control section configured to control the lens edging section to perform edging, using the edging shape data acquired by the data acquisition section when the calculation switching section switches the setting of the calculating section so as to select the second calculating section for calculating the edging shape data.

Advantage of the Invention

According to the present invention, a spectacle lens can be edged into a desired finish shape, irrespective of a difference in makers of a lens edger used for edging the spectacle lens.

BRIEF DESCRIPTION OF THE DRAWINGS

FIG. 3 is a view showing a function of a blocker.

DETAILED DESCRIPTION OF THE INVENTION

Figure 1:
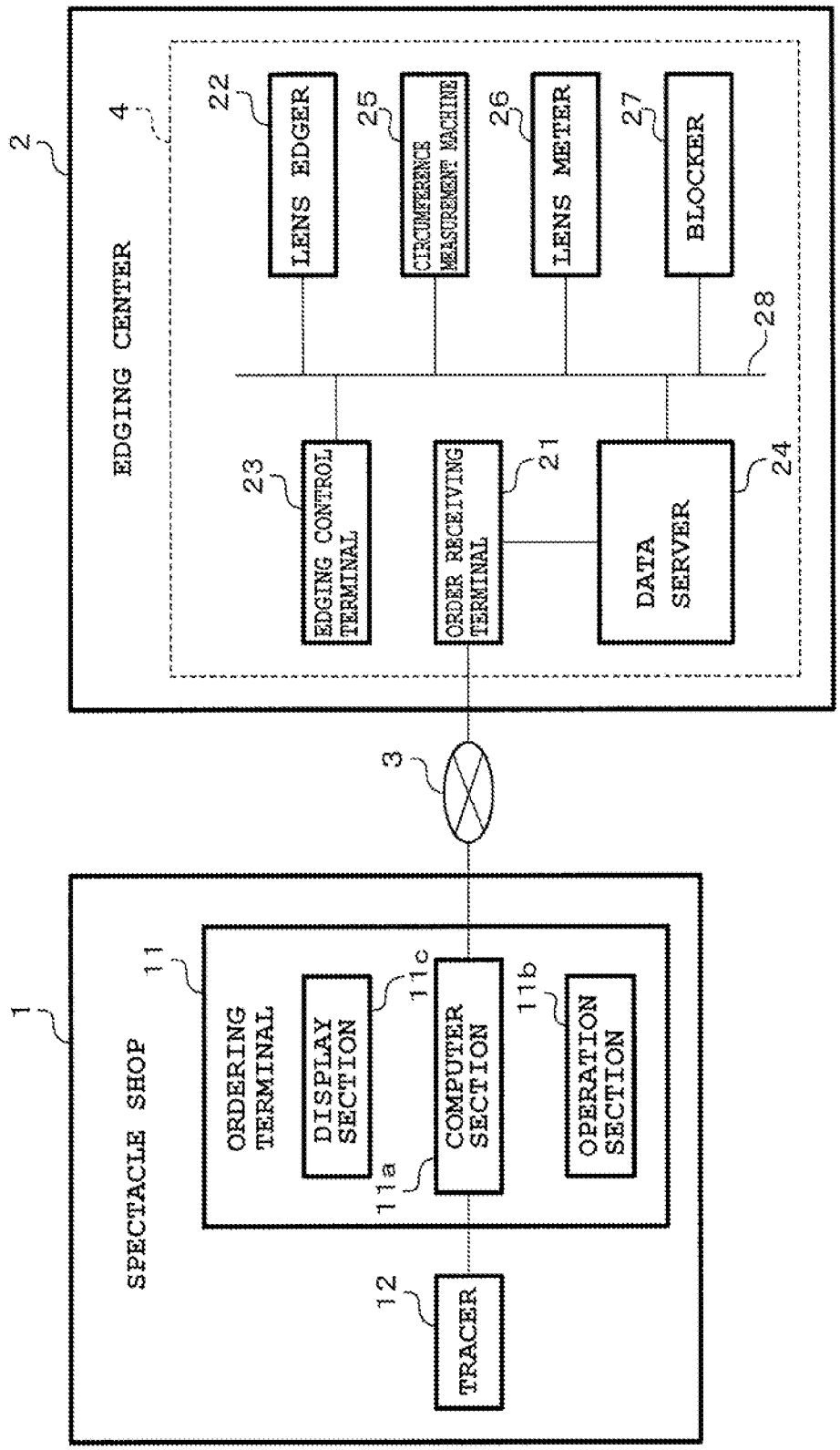
FIG. 1 is a block diagram showing a constitutional example of an ordering/order receiving system of a spectacle lens.

Embodiments of the present invention will be described hereafter in detail, with reference to the drawings.

Explanation is given for an embodiment of the present invention in the following order.

1. Structure of an ordering/order receiving system of a spectacle lens
2. Structure of a lens edging system
3. Structure of a lens edger 4. Structure of an edging control terminal
5. Regarding an edging shape calculation program
6. Processing flow of an ordering/order receiving system
7. Method for manufacturing a spectacle lens
8. Effect of an embodiment
9. Other embodiment

1. Structure of an Ordering/Order Receiving System of a Spectacle Lens

FIG. 1 is a block diagram showing a constitutional example of an ordering/order receiving system of a spectacle lens. In the ordering/order receiving system shown in the figure, a spectacle shop 1 at an ordering side of the spectacle lens, and an edging center 2 of a lens maker at an order receiving side of the spectacle lens, are connected via a communication network 3 such as Internet. In an actual system, a plurality of spectacle shops 1 are connected to one edging center 2 via a communication network 3. However, the figure is simplified here to show only one spectacle shop 1. Also, a plurality of edging centers 2 are geographically dispersed in some cases. However, the figure is simplified here to show only one edging center 2. Also, not only the spectacle shop 1 but also an edging plant or a lens maker are the ordering side when edging of a spectacle lens is consigned to the edging center 2 for example by the outside edging plant or other lens maker.

An ordering terminal 11 is disposed in the spectacle shop 1. The ordering terminal 11 is constituted using a hardware such as CPU (Central Processing Unit), ROM (Read-Only Memory), RAM (Random Access Memory), and HDD (Hard Disk Drive), etc. The ordering terminal 11 includes a computer section 11*a*, an operation section 11*b*, and a display section 11*c*. The computer section 11*a* has a calculation processing function as a computer. Further, the computer section 11*a* is connected to the communication network 3 via a router, etc., not shown, so that data can be transferred to other apparatus through the communication network 3. The operation section 11*b* is composed of a keyboard, a mouse, and a touch panel, etc., so that information is inputted into the computer section 11*a*. The display section 11*c* is composed of a liquid crystal display, so that an image is displayed according to an instruction given from the computer section 11*a*.

Further, in the spectacle shop 1, a tracer 12 is connected to the ordering terminal 11. The tracer 12 three-dimensionally measures a frame shape of a spectacle frame. A measurement result of the tracer 12 is inputted into the computer section 11*a* as frame shape data of the spectacle frame. A publicly-known tracer can be used as the tracer 12.

An order receiving terminal 21 is disposed in the edging center 2. Similarly to the abovementioned ordering terminal 11, the order receiving terminal 21 is constituted using a publicly-known hardware as a constitutional element of the computer. The order receiving terminal 21 is connected to the communication network 3 via the router, etc., not shown. Thus, various kinds of data including at least ordering and order reception data of the spectacle lens can be transferred between the ordering terminal 11 and the order receiving terminal 21. In transferring the ordering and order reception data using the communication network 3, the ordering terminal 11 sends the order data to the order receiving terminal 21, and the order receiving terminal receives the order data sent from the ordering terminal 11. Thus, the data (called "ordering and order reception data hereafter) transferred between the ordering terminal 11 and the tracer 12, includes various information (data) used for edging the spectacle lens. Here, as an example, order reception data (order data) includes spectacle frame information, spectacle lens information, layout information, and prescription information, etc.

As the information belonging to the spectacle frame information, for example, materials of the spectacle frame, frame shape data, a frame size, a tilt angle, a frame color, a frame maker, and a mode, etc., can be given. As the information belonging to the spectacle lens information, for example, the kind of the spectacle lens (a single focus lens, a double focus lens, and a progressive power lens, etc.), materials, a lens curve, a lens color, and presence/absence of a functional film (a dimmer film, a polarizing film, a hard coat film) can be given. As the information belonging to the layout information, for example, an interpupillary distance (interpupillary distance for distance vision, interpupillary distance for near vision), pupillary height, and a fitting point (eye point), etc., can be given. As the prescription information, for example, surface power, astigmatic power, axis of astigmatism, addition power, and a prism prescription, etc., can be given.

2. Structure of a Lens Edging System

In the edging center 2, a lens edging system 4 of the spectacle lens is constructed.

The edging system 4 of this embodiment corresponds to the abovementioned just fit edging system. In the just fit edging system, edging shape data used for edging is calculated by the edging control terminal 23, using lens design data of the spectacle lens to be edged, and the calculation result is provided to the lens edger 22, to thereby edge the spectacle lens. Therefore, in a case of simply edging the spectacle lens, not both of the edging control terminal 23 and the lens edger 22 are required to have a function of calculating the edging shape data. However, in the edging system 4 of this embodiment, both of the edging control terminal 23 and the lens edger 22 have the function of calculating the edging shape data. The reason why such a structure is employed, will be descried later together with the "effect of an embodiment".

The edging system 4 includes not only the abovementioned order receiving terminal 21, but also the lens edger 22, the edging control terminal 23, a data server 24, a circumference measurement machine 25, a lens meter 26, and a blocker 27, which are mutually connected via a communication line 28 such as LAN (Local Area Network), etc. The number of the equipment and terminals constituting the edging system 4 is not limited to one, and multiple numbers of equipment and terminals may be acceptable. Further, a connecting relation between the lens edger 22 and the edging control terminal 23 via the communication line 28 may be a relation of 1:1 or may be a relation of m:1 (m is an integer of 2 or more).

The order receiving terminal 21 registers order data received via the communication network 3 into a data server 24, as order reception data. The order reception data is registered in the data server 24 for example, in a unit with right and left pair of spectacle lenses as one set. Further, each order reception data is registered in the data server 24, with job identification information added thereto, which can be generated by reading a barcode, etc., for example for managing one order reception data as one job. The job identification information is the information used for linking of information (data) required for edging the spectacle lens. Regarding the job identification information, for example, every time the order reception data is received by the order receiving terminal 21, the order receiving terminal 21 or the edging control terminal 23 may allocate the job identification information to each order reception data as one job. Then, in the processing thereafter, the barcode corresponding to the job identification information is outputted to a sheet by print, etc., and by using this barcode, the job identification information may be generated and utilized. Note that in FIG. 1, the order receiving terminal 21 is connected to the communication line 28 via the data server 24. However, the present invention is not limited thereto, and the order receiving terminal 21 may be directly connected to the communication line 28.

The lens edger 22 is the lens edger for edging the spectacle lens, so as to be settled in the spectacle frame. The spectacle lens to be edged (called a "lens to be edged") is designed, manufactured, and provided by a lens maker, which is the lens in a state of not being edged yet corresponding to a frame shape of the spectacle frame. Generally, an uncut lens with a round outer shape is treated as the lens to be edged. Edging by the lens edger 22 is performed through two edging steps such as rough edging and finish edging broadly. The rough edging is an edging step of edging the spectacle lens in a shape of one size larger than the finish shape of a final lens. The finish edging is an edging step of edging the spectacle lens corresponding to the finish shape of the final lens and is the step including a bevel edging. The bevel edging is the edging of forming a bevel (for example, a mountain-shaped bevel, a V-groove shaped bevel (grooving), a flat bevel, etc.) on an outer peripheral surface of the spectacle lens. The rough edging and the finish edging may be performed by changing an edging tool in each step, or may be performed by using the same edging tool. Further, the rough edging and the finish edging may be performed by changing a lens edging system in each step, like a case that the rough edging is performed in cutting, and the finish edging is performed in grinding, or the same edging system may be used. Further, the finish edging may include a mirror finish edging as needed. The mirror finish edging is the edging for giving a polish by grinding an edge surface of a lens using a fine tool.

The edging control terminal 23 calculates the edging shape data used for edging by the lens edger 22, and registers the calculated edging shape data in the data server 24. The edging shape data is also used as reference data for determining a condition for using each kind of tool equipped with the lens edger, and determining a condition for edging the spectacle lens by moving and driving each kind of stage, rotation axis, motor, and cylinder, etc., equipped with the lens edger.

The data server 24 stores and accumulates each kind of information required for edging the spectacle lens. The information stored in the data server 24 includes the abovementioned order reception data, and lens design data of the spectacle lens. The lens design data includes lens physical data (dioptric power, Abbe number, specific gravity, etc.), radius vector data, surface shape data of a convex surface (optical surface), surface shape data of a concave surface (optical surface), lens thickness data, and outer diameter data, etc. The lens design data of various spectacle lenses possessed by a lens maker, is registered in the data server 24 in advance.

The circumference measurement machine 25 measures a circumference of the spectacle lens (called a "finished lens" hereafter) which has undergone finish edging by the lens edger 22. In such a circumference measurement, the circumference measurement machine 25 measures a peripheral shape of the finished lens as three-dimensional shape data, and obtains the circumference of the finished lens by calculation based on the three-dimensional lens peripheral shape data. Therefore, the circumference of the finished lens is varied depending on a depth of a bevel curve even when a lens outer peripheral diameter is the same, if the finished lens is viewed from an optical axis direction. Specifically, the circumference becomes longer, as the bevel curve is deeper. Note that an item that can be measured by the circumference measurement machine 25 is not limited to the circumference described here, and for example, a height dimension and a width dimension, etc., of the finished lens can also be measured.

The lens meter 26 measures an optical center and an astigmatic axis, etc., of the spectacle lens, and attaches a dot print to a position on an optical surface being an optical center of the spectacle lens based on the measurement result. The blocker 27 functions to mount a lens holder on the spectacle lens, with the dot print attached by the lens meter 26 as a reference (center), so that the spectacle lens is held by the lens holder.

Figure 2:
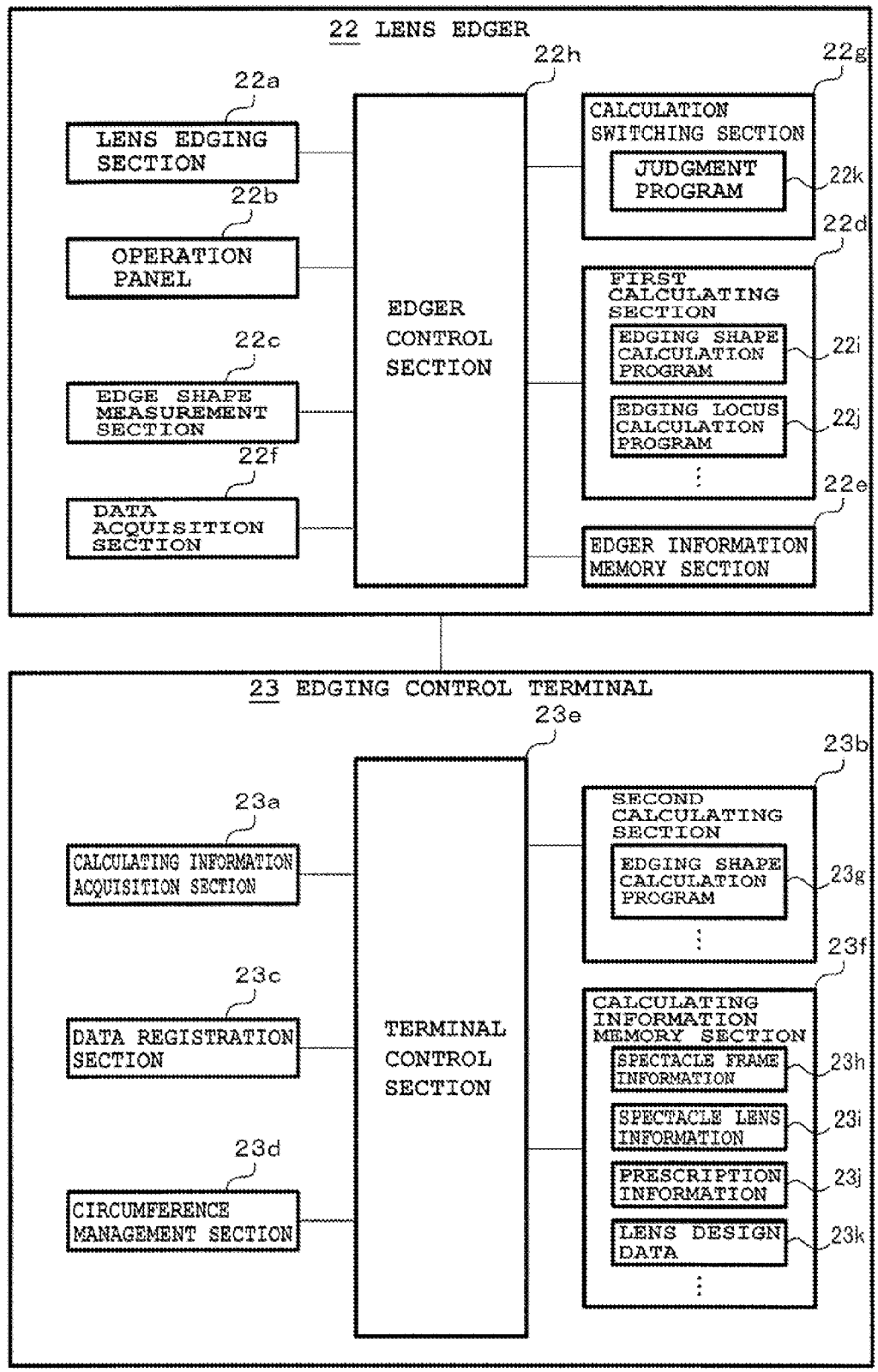
FIG. 2 is a block diagram showing a functional constitutional example of a lens edger and an edging control terminal.

FIG. 2 is a block diagram showing a functional constitutional example of the lens edger and the edging control terminal.

Structures of the lens edger 22 and the edging control terminal 23 will be sequentially described hereafter.

3. Structure of a Lens Edger

The lens edger 22 includes a lens edging section 22a, an operation panel 22b, an edge shape measurement section 22c, a first calculating section 22d, a edger information memory section 22e, a data acquisition section 22f, a calculation switching section 22g, and a lens edger control section 22h.

The lens edging section 22a applies edging (rough edging and finish edging) to a spectacle lens 30. Therefore, the lens edging section 22a includes each kind of edging tool, stage, rotation axis, motor, and cylinder, etc., required for the edging.

The operation panel 22b is used by an operator for each kind of operation of the lens edger 22.

The spectacle lens 30 supplied to the lens edging section 22a as an edged lens, is supplied to the blocker 27 beforehand, and is held by the lens holder 40 as shown in FIG. 3(a) and FIG. 3(b). The lens holder 40 holds the spectacle lens 30 by making the lens air-tightly adhered to one of the optical surfaces (convex surfaces) 31 of the spectacle lens 30 through a seal pad 41. As a method for holding the spectacle lens 30, there is a suction cup for fitting the spectacle lens 30 to the lens holder 40 by suction. A position on the spectacle lens 30 selected by the blocker 27 as a block position, is different depending on the kind and a lens shape of the spectacle lens. Generally, eye point block or frame center block are performed. However, in a case of a double focus lens, a segment top is set as a block position in some cases. Generally, the block position is indicated as an optical center for the single focus lens, and is indicated as the segment top for the double focus lens, and is indicated as a deviation from a prism measurement point expressed by a XY coordinate value for the progressive lens. However, the method for indicating the block position is not limited thereto. The center of the block position on the spectacle lens 30 by the blocker 27, is a rotation center position when the spectacle lens 30 is rotated in an edging process. Therefore, information for indicating the block position (called "block position information" hereafter) is one of the information required for calculating the edging shape data which is used for edging. The block position is obtained by calculation performed by the edging control terminal 23, and based on the calculation result, the spectacle lens is mounted at a position indicated by the blocker 27 so as to be held by the lens holder. In this case, the edging control terminal 23 registers the data (block position information) regarding the block position obtained by calculation, in the data server 24 so as to correspond to job identification information. Further, the blocker 27 reads the barcode attached to a tray, etc., on which the spectacle lens before block is placed, using a barcode reader attached to the blocker 27, and reads indicated data from the data server 24 using the job identification information generated thereby. Further, when the block position is determined by the blocker 27 by a method other than the abovementioned method, the blocker 27 registers the block position information in the data server 24 so as to correspond to the job identification information, so that the block position information can be read by the lens edger 22 or the edging control terminal 23.

Figure 4:
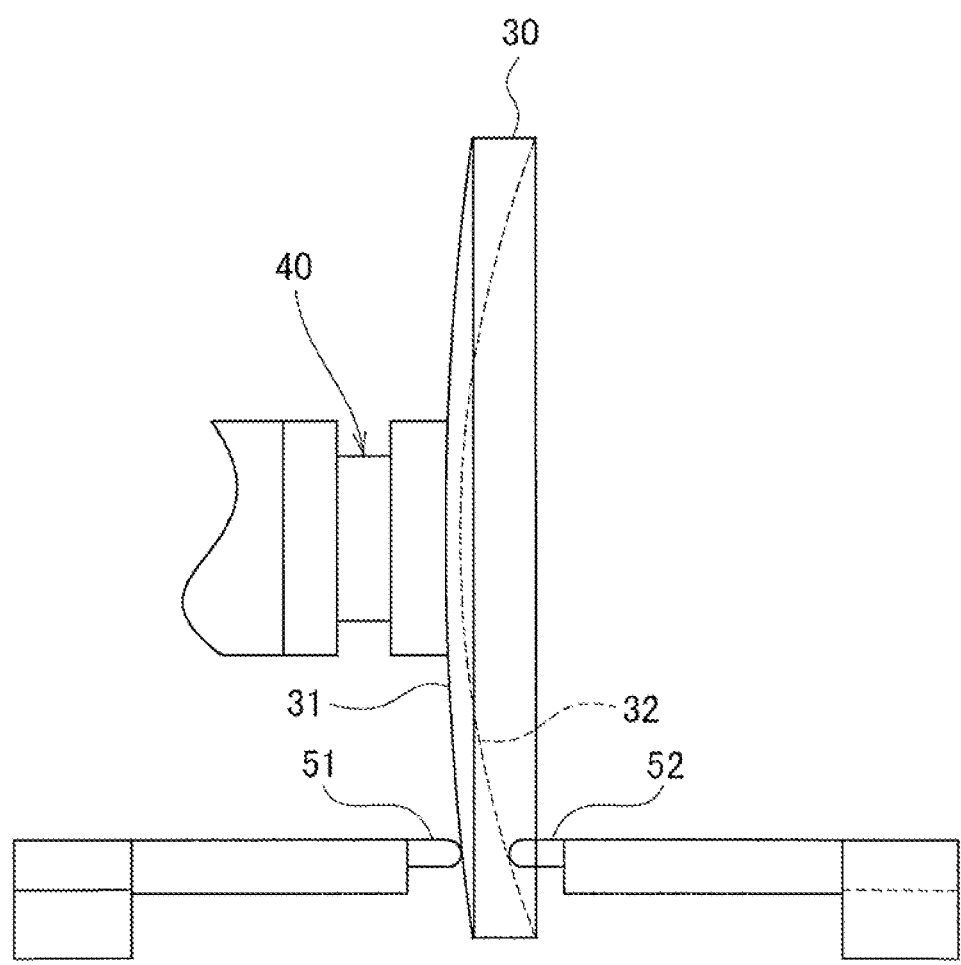
FIG. 4 is a view showing a constitutional example of an edge shape measurement section.
Figure 5:
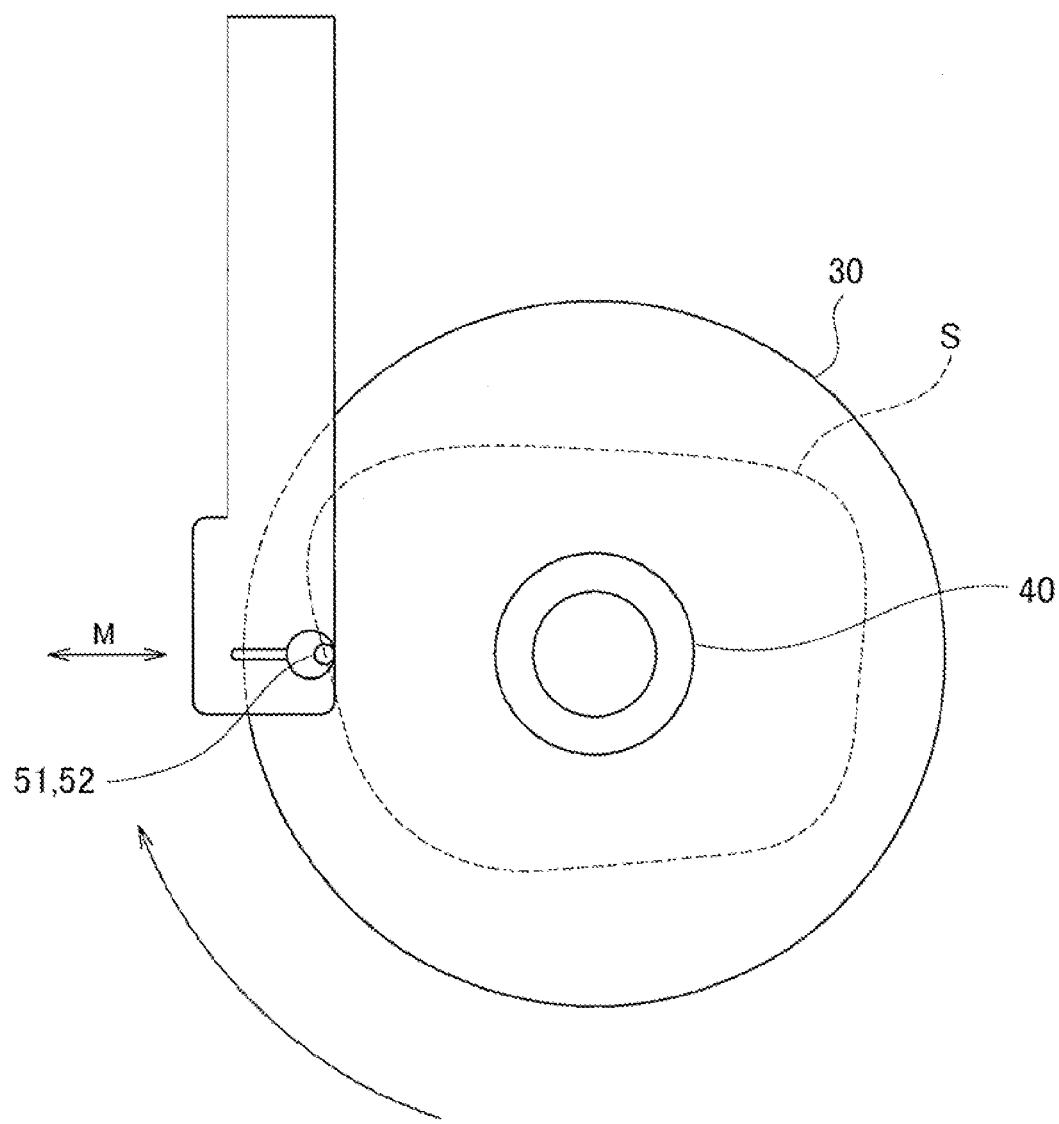
FIG. 5 is a view showing a method for measuring an edge shape.

The edge shape measurement section 22c measures an edge shape of the spectacle lens 30. As shown in FIG. 4, the edge shape measurement section 22c performs measurement of the edge shape by making a pair of probes 51 and 52 brought into contact with optical surfaces 31 and 32 of the spectacle lens 30 which is held by the lens holder 40. Specifically, as shown in FIG. 5, the edge shape of the spectacle lens 30 is measured while rotating the spectacle lens 30 integrally with the lens holder 40, and suitably displacing the pair of probes 51 and 52 in a diameter direction M of the spectacle lens 30. At this time, the pair of probes 51 and 52 are displaced in the diameter direction M of the spectacle lens 30 simultaneously with the rotation of the spectacle lens 30, so as to trace a locus S based on previously given shape data for measuring the edge shape. Thus, the position information regarding the optical surface of the spectacle lens 30 on the locus S, and information regarding the edge thickness can be obtained. Not only the method described here, but also the other publicly-known method may be used for measuring the edge shape.

The first calculating section 22d performs various calculations regarding the edging applied to the spectacle lens. The first calculating section 22d has at least an edging shape calculation program 22i for calculating the edging shape data used for the edging by the lend edging section 22a, and an edging locus calculation program 22j for calculating edging locus data. Other calculation program is not shown. The edging shape calculation program 22i corresponds to the "first calculation program".

Figure 6:
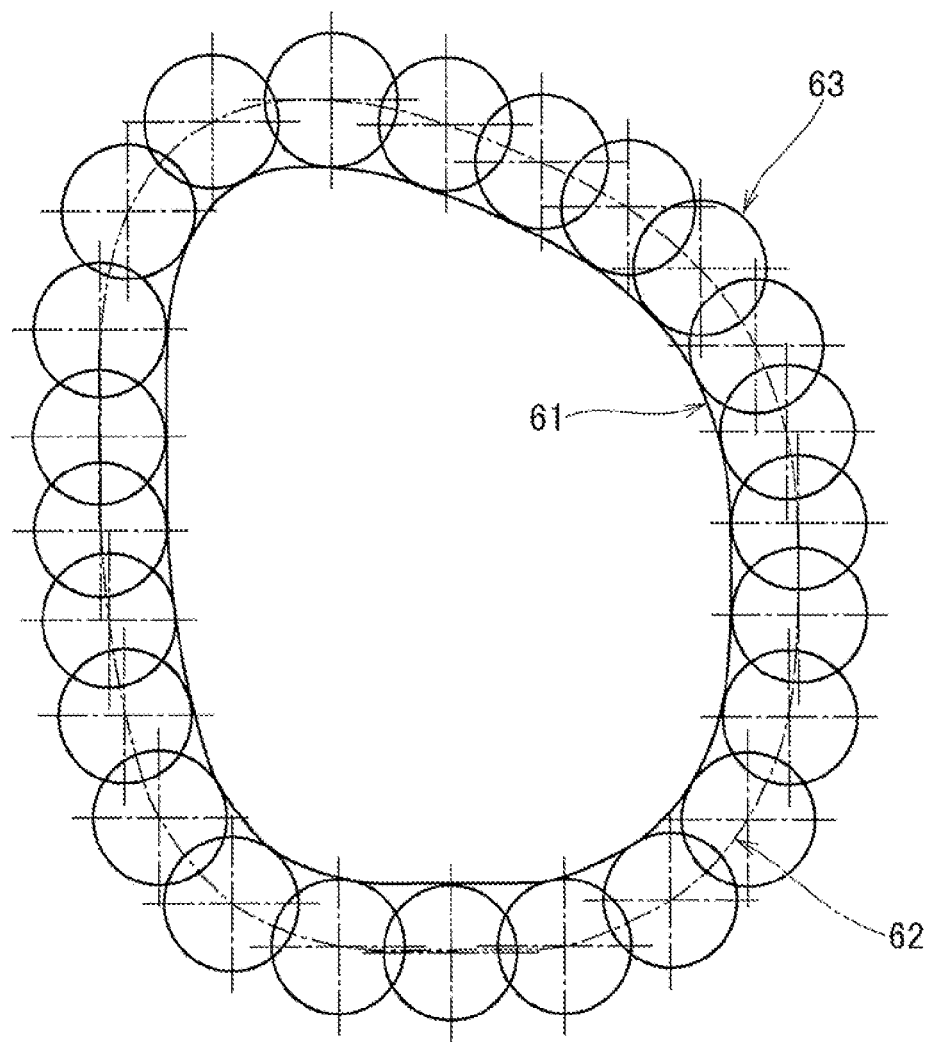
FIG. 6 is a view showing a difference between edging shape data and edging locus data.

Here, explanation is given for a difference between the edging shape data and the edging locus data, using FIG. 6.

Edging shape data 61 is the data for specifying an edged shape of the spectacle lens to be edged. Namely, the edging shape data 61 is the data for specifying the shape of the spectacle lens obtained by edging. Meanwhile, edging locus data 62 is the data showing the locus of an edging tool 63 used for the edging, so as to edge the spectacle lens into a shape specified by the edging shape data 61. Therefore, the edging shape data 61 is required for calculating the edging locus data 62, in addition to the information such as a tool diameter, etc., of the edging tool 63. Further, a sending amount of the edging tool which is one of the factors to determine the edging locus, is controlled based on the edging locus data 62. Namely, the edging locus data 62 is the data for determining which condition is used for controlling the sending amount, etc., of the edging tool.

Further, when the spectacle lens is edged by dividing the edging into the rough edging and the finish edging, the edging shape data 61 is calculated so as to be used for the rough edging and the finish edging. Namely, when the rough edging is performed, the edging shape data used for the rough edging is calculated before the rough edging, and when the finish edging is performed, the edging shape data used for the finish edging is calculated before the finish edging.

Meanwhile, the edging locus data 62 is calculated for every edging tool used for the edging. For example, when the rough edging is performed by one edging tool, one edging locus data is calculated, corresponding to this edging tool. Further, when the finish edging is performed using a plurality of edging tools sequentially, with different tool diameter and tool shape, etc., a plurality of edging locus data are calculated in a relation of 1:1 with the plurality of edging tools.

In FIG. 6, the edging shape data 61 is expressed by two-dimensional data. However, the edging shape data 61 is actually three-dimensional data.

As the edging shape data calculated by the first calculating section 22d, edging shape data used for the rough edging (called "rough edging shape data" hereafter), and edging shape data used for the finish edging (called "finish edging shape data" hereafter) can be given. Even in a case of calculating the edging shape data of any one of the edging steps, the first calculating section 22d calculates the edging shape data without using the lens design data of the spectacle lens. In other words, the edging shape calculation program 22i does not include the lens design data of the spectacle lens in the parameter required for calculating the edging shape data.

The edger information memory section 22e stores edger information. The edger information is the information regarding the lens edger 22 itself, corresponding to the information regarding propriety of edging, and the information regarding an edging parameter, etc., for example. The information regarding the propriety of edging includes a maximum/minimum edging diameter that can be edged, a maximum/minimum edge thickness that can be edged, and a lens material that can be edged, etc. The edging parameter includes a tool shape and a tool diameter of the edging tool, and a bevel shape to be edged, etc.

The edger information stored in the edger information memory section 22e is sent to the edging control terminal 23 from the lens edger 22, in a stage when data can be communicated via the communication line 28, between the lens edger 22 and the edging control terminal 23. Thus, the edger information sent to the edging control terminal 23 from the lens edger 22, is acquired by a calculating information acquisition section 23a as one of the calculating information of the edging shape data.

The data acquisition section 22f acquires various data via the communication line 28. For example, the data acquisition section 22f acquires the edging shape data calculated by the second calculating section 23b described later and outputted to outside by the edging control terminal 23. Various systems can be considered as a system of acquiring data by the data acquisition section 22f. For example, the following system can be considered: namely, the data acquisition section 22f access the data server 24 using the job identification information obtained by reading the abovementioned barcode, etc., to thereby read and acquire the data registered in the data server 24, so as to correspond to the job identification information. Further, in addition to this system, the following system can also be considered: namely, the data acquisition section 22f requests the edging control terminal 23 to provide (send) data, and responding to such a request, the data provided by the edging control terminal 23 is acquired. The present invention is not particularly limited to any one of the acquisition systems.

The calculation switching section 22g switches the setting of the calculating section so as to select either one of the first calculating section 22d and the second calculating section 23b for calculating the edging shape data used for at least the edging, in each kind of calculation items regarding the edging applied to the spectacle lens (lens to be edged) 30. The calculation switching section 22g has a judgment program 22k for judging which of the first calculating section 22d and the second calculating section 23b is set as a calculation body for calculating the edging shape data, and setting of the calculation body is switched based on the judgment program 22k.

The calculation body may be switched manually or may be switched automatically. Details are described later.

The lens edger control section 22h controls processing and operation of the whole body of the lens edger 22 including the abovementioned lens edging section 22a, edge shape measurement section 22c, first calculating section 22d, edger information memory section 22e, and data acquisition section 22f. Specifically, the lens edger control section 22h controls the drive of the lens edging section 22a according to the edging locus data calculated based on the edging shape data used for edging the spectacle lens. Further, the lens edger control section 22h controls the drive of the edge shape measurement section 22c according to the shape data for measuring the edge shape (details are described later). Further, the lens edger control section 22h controls calculation processing by the first calculating section 22d, update processing of the edger information in the edger information memory section 22e, and data acquisition processing by the data acquisition section 22f, etc. The lens edger control section 22h communicates with an external device (for example, the edging control terminal 23) as needed, to thereby transfer data between the lens edger control section 22h and the external device.

4. Structure of the Edging Control Terminal

The edging control terminal 23 includes the calculating information acquisition section 23a, the second calculating section 23b, a data registration section 23c, a circumference managing part 23d, a terminal control section 23e, and the calculating information memory section 23f. These functional sections are realized by a function of a computer section (not shown) provided in the edging control terminal 23.

The calculating information acquisition section 23a acquires the calculating information used for calculating the edging shape data. The calculating information includes at least not only the spectacle frame information, spectacle lens information, layout information, and prescription information, but also the edger information and lens design data for the spectacle lens. Above all, the lens design data is used only in a case of calculating the edging shape data, etc., by the second calculating section 23b. The calculating information (only spectacle frame information 23h, spectacle lens information 23i, prescription information 23j, and lens design data 23k are displayed in FIG. 2 for the convenience of explanation) acquired by the calculating information acquisition section 23a, is stored in the calculating information memory section 23f.

The second calculating section 23b performs various calculations regarding the edging applied to the spectacle lens. The second calculating section 23b has at least an edging shape calculation program 23g for calculating the edging shape data used for edging by the lens edging section 22a of the lens edger 22. Other calculation program is not shown. The edging shape calculation program 23g corresponds to a "second calculation program". Rough edging shape data and finish edging shape data can be given as the edging shape data calculated by the second calculating section 23b. This point is common in the edging shape data calculated by the first calculating section 22d of the lens edger 22.

The data registration section 23c registers each kind of data in the data server 24. For example, the data registration section 23c registers the edging shape data obtained by calculation by the second calculating section 23b, in the data server 24, so as to correspond to the abovementioned job identification information. The job identification information used for the registration is the same information as the job identification information attached to the order reception data read from the data server 24 by the calculating information acquisition section 23a, when calculating the edging shape data by the second calculating section 23b.

The circumference management section 23d confirms whether the circumference of the spectacle lens (finished lens) edged by the lens edger 22, falls within a previously set allowable range, and manages so that the circumference falls within an allowable range. The circumference management section 23d manages the circumference based on the measurement result of the circumference measurement machine 25. The circumference is managed for reducing (correcting) a variation of the circumference generated in the spectacle lens after finish edging in the edging process, the variation being caused by abrasion, etc., of the edging tool in the lens edger 22.

The terminal control section 23e controls the processing and operation of the whole body of the edging control terminal 23, including the abovementioned calculating information acquisition section 23a, second calculating section 23b, data registration section 23c, circumference management section 23d, and calculating information memory section 23f.

5. Regarding an Edging Shape Calculation Program

Here, a difference between the edging shape calculation program 22i possessed by the first calculating section 22d and the edging shape calculation program 23g possessed by the second calculating section 23b will be described.

First, the edging shape calculation program 22i possessed by the first calculating section 22d is configured to calculate the edging shape data without using the lens design data. Meanwhile, the edging shape calculation program 23g possessed by the second calculating section 23b is configured to calculate the edging shape data using the lens design data of the spectacle lens to be edged.

In other words, the edging shape calculation program 22i possessed by the first calculating section 22d does not include the lens design data of the spectacle lens in the parameter required for calculating the edging shape data, but the edging shape program 23g possessed by the second calculating section 23b includes the lens design data of the spectacle lens in the parameter required for calculating the edging shape data.

Therefore, when the edging shape data is calculated using the same order reception data, the edging shape data obtained as a calculation result by the first calculating section 22d, and the edging shape data obtained as a calculation result by the second calculating section 23b, are substantially different data, although they are in common in a data form. This means that the edging shape of the spectacle lens specified by the edging shape data calculated by the first calculating section 22d, and the edging shape of the spectacle lens specified by the edging shape data calculated by the second calculating section 23b, are different from each other.

Thus, as the reason for generating the difference of the calculation result of the edging shape data, the following two reasons can be given. One of the reasons is that the difference of the calculation result is generated depending on a difference whether or not the lens design data is used for calculating the edging shape data as described above. The other one of the reasons is that the difference of the calculation result is generated because a finish shape of the spectacle lens as a reference (ideal shape) of the edging shape calculation program possessed by the first calculating section 22d, and a finish shape of the spectacle lens as a reference of the edging shape calculation program 23g possessed by the second calculating section 23b, are different from each other.

Accordingly, when the edging shape data is calculated by the first calculating section 22d, the spectacle lens is edged so as to match the finish shape estimated by the edging shape calculation program 22i. Also, when the edging shape data is calculated by the second calculating section 23b, the spectacle lens is edged so as to match the finish shape estimated by the edging shape calculation program 23g. Namely, the lens edger 22 and the edging control terminal 23 calculate the edging shape data based on the edging shape calculation programs 22i and 23g prepared by the lens edger 22 and the edging control terminal 23, as its own reference respectively. Therefore, difference is generated in the finish shape of the spectacle lens depending on whether the first calculating section 22d or the second calculating section 23b is selected as the calculation body for calculating the edging shape data. Therefore, for example, when the edging system 4 is constructed in the edging center 2 using the edging control terminal 23 manufactured by the lens maker and the lens edger 22 manufactured by the other lens edger maker, the difference is generated in the finish shape of the spectacle lens, depending on whether the first calculating section 22d or the second calculating section 23b is selected as the calculation body for calculating the edging shape data. Further, when a plurality of lens edgers 22 of different lens edger makers are installed in the edging center 2, the difference is generated in the finish shape of the spectacle lens depending on the maker and a model of the lens edger 22 if the calculation body for calculating the edging shape data is set as the first calculating section 22d.

The edging system 4 of this embodiment is configured to realize the edging applied to the spectacle lens in a desired finish shape, irrespective of the maker and the model of the lens edger 22.

A processing flow of an ordering and order receiving system and the method for manufacturing a spectacle lens will be sequentially described hereafter.

6. Processing Flow of an Ordering and Order Receiving System

In an ordering and order receiving system of the spectacle lens having the abovementioned structure, ordering and order receiving processing is applied to the spectacle lens by the following procedure.

First, in spectacle shop 1, a clerk who operates the operation section 1ib of the ordering terminal 11, inputs data such as spectacle frame information, spectacle lens information, layout information, and prescription information, etc. The order data including such information is sent to the order receiving terminal 21 via the communication network 3, by performing operation of deciding an order based on the order data, by the clerk who operates the operation section 11b while viewing an ordering screen displayed on the display section 11c. The operation for deciding the order includes the operation of pressing (click) an "order decision button" in the ordering and order receiving screen displayed on the display section 11c using a mouse by the clerk of the spectacle shop for example.

Meanwhile, the edging center 2 receives order data sent from the ordering terminal 11 by the order receiving terminal 21. When the order receiving terminal 21 receives the order data, job identification information is newly generated every time the data is received, and the order reception data (order data) is registered in the data server 24 so as to correspond to the job identification information.

7. Method for Manufacturing a Spectacle Lens

Subsequently, a method for manufacturing a spectacle lens using the abovementioned lens edging system will be described.

First, prior to the explanation for the method for manufacturing a spectacle lens, several preconditions are described.
(Precondition 1)

It does not matter when each kind of information is set in the data server 24, if it is registered before the information is used for the calculation by the first calculating section 22d or the second calculating section 23b. For example, block position information may be registered in the data server 24 when the block position is indicated by the edging control terminal 23 to the blocker 27, or may be registered in the data server 24 when a notification regarding the block position is received from the blocker 27. Further, the lens design data may be registered in the data server 24 at an arbitrary timing, so as to correspond to lens specifying information capable of uniquely specifying the lens design data. The lens specifying information is the information that can be generated using the spectacle lens information and the prescription information included in the order reception data. Therefore, the calculating information acquisition section 23a generates the lens specifying information using the spectacle lens information and the prescription information, and reads the lens design data registered so as to correspond to the lens specifying information, from the data server 24. The lens design data can be registered in the data server 24 any time, because the lens design data is the data possessed by the lens maker.
(Precondition 2)

The edging locus data calculated by the first calculating section 22d is the same data, if the edging shape data which is a base of the edging locus data is the same data. This is because the first calculating section 22d calculates the edging locus data based on the common (same) edging locus calculation program 22j, irrespective of whether the edging shape data is calculated by the first calculating section 22d by itself, or the edging shape data is calculated by the second calculating section 23b. Further, the lens edging section 22a edges the spectacle lens by moving the edging tool, under a control condition determined based on the edging locus data. Therefore, if the edging locus data calculated by the first calculating section 22d is the same, the shape of the spectacle lens obtained after edging is also the same.

As described above, if the edging shape data used for calculating the edging locus data is the same, the shape of the spectacle lens after edging is also the same.

The method for manufacturing a spectacle lens under such a precondition will be described.

First, an operator of the lens edger 22 reads the barcode attached to the tray, etc., on which the spectacle lens before edging is placed, by a barcode reader attached to the lens edger 22. The barcode attached to the tray, etc., is obtained by encoding the job identification information. Therefore, if the barcode is read by the barcode reader attached to the lens edger 22, the job identification information is generated as a result of reading the barcode, and the edging control terminal 23 is notified of the job identification information from the lens edger 22. Then, the edging control terminal 23 acquires the information required for edging the spectacle lens, by the calculating information acquisition section 23a. Meanwhile, the spectacle lens 30 on which the lens holder 40 is previously mounted by the blocker 27, is set in the lens edging section 22a by the operator of the lens edger 22. In this stage, the block position information at the time of blocking the spectacle lens 30 by the blocker 27, is already registered in the data server 24, so as to correspond to the job identification information. Thereafter, the operator of the lens edger 22 gives an instruction of starting the edging using the operation panel 22b. Thus, processing of edging the spectacle lens is executed, according to the processing flow shown in FIG. 7 and FIG. 8. The processing flow is more specifically described hereafter.

First, switch of setting S1 is performed. This step is performed by the lens edger 22. Specifically, setting of a calculating section is switched so as to select either one of the first calculating section 22d and the second calculating section 23b for calculating the edging shape data. Namely, the calculation body is switched, so as to select either one of the first calculating section 22d and the second calculating section 23b, for calculating the edging shape data. When the calculation switching section 22g switches the setting of the calculation body so as to select the first calculating section 22d for calculating the edging shape data, a calculating function of the second calculating section 23b is in an invalid state for calculating the edging shape data. Also, when the calculation switching section 22g switches the setting of the calculation body so as to select the second calculating section 23b for calculating the edging shape data, the calculating function of the first calculating section 22d is in the invalid state for calculating the edging shape data.

It can be considered that there is two cases of switching the setting of the calculation body, such as performing manually and performing automatically. Specific examples are given below.

(A Specific Example of Switching the Setting Manually)

The calculation body is switched using the operation panel 22b. In the case of switching the setting using the operation panel 22b, for example, switches (Hard switch such as DIP switch, push button switch, and rotary switch, or the switch provided on a touch panel) are provided on the operation panel 22b. Then, based on the result selected by the operator using the switch, the calculation switching section 22g switches the setting of the calculating section so as to select either one of the first calculating section 22d and the second calculating section 23b for calculating the edging shape data. Specifically, when the operator of the lens edger 22 performs switching operation of selecting the first calculating section 22d, the setting is switched so as to select the first calculating section 22d for calculating the edging shape data. Also, when the operator of the lens edger 22 performs switching operation of selecting the second calculating section 23b, the setting is switched so as to select the second calculating section 23b for calculating the edging shape data. In broader meaning, the calculation items for calculating the edging shape in etching the spectacle lens, includes shape data for measuring an edge shape, other than the rough edging shape data and the finish edging shape data, wherein either one of the first calculating section 22d and the second calculating section 23b can be selected for calculating the edging shape.

(Specific Example of Switching the Setting Automatically)

The calculating section is switched using a soft switch, wherein an internal setting is switched by setting a flag (variable) on a judgment program 22i of the calculation switching section 22g. In such a switching using the soft switch, the setting of the calculating section is switched so as to select either one of the first calculating section 22d and the second calculating section 23b for calculating the edging shape data, using at least one of the information of the spectacle lens information, the spectacle frame information, and the prescription information included in the order reception data used for edging for example. Specifically, the calculation switching section 22g sets the flag at "0" when a value of a lens curve belonging to the spectacle lens information is less than a specific value (for example, 7 curve), and sets the flag at "1" when the value of the lens curve is a specific value or more. Also, the calculation switching section 22g sets the flag at "0" when a tilt angle belonging to the spectacle frame information is less than a specific angle (for example, 10 degrees), and sets the flag at "1" when the tilt angle is a specific angle or more. In the lens edger 22, the case of setting the flag at "0" means the case that the edging shape data is calculated by the first calculating section 22d, and the case of setting the flag at "1" means the case that the edging shape data is calculated by the second calculating section 23.

Further, as the other setting, for example, setting of the calculating section is switched so as to select either one of the first calculating section 22d and the second calculating section 23b for calculating the edging shape data, by outputting a command signal to the lens edger 22 from the edging control terminal 23, for giving an instruction of selecting either one of the first calculating section 22d and the second calculating section 23b to calculate the edging shape data, and raising the flag through software by the calculation switching section 22g based on the above command signal. Specifically, the edging control terminal 23 outputs to the lens edger 22, one of the command signals of a command signal (called a "first command signal" hereafter) for calculating the edging shape data by the first calculating section 22d, and a command signal (called a "second command signal" hereafter) for calculating the edging shape data by the second calculating section 23b. Meanwhile, when the first command signal is received from the edging control terminal 23, the calculation switching section 22g of the lens edger 22 sets the flag at "0", and when the second command signal is received from the edging control terminal 23, the calculation switching section 22g sets the flag at "1".

Further, when the calculation body for calculating the edging shape data is automatically switched as described above, for example, the edging control terminal 23 changes the command signal outputted to the lens edger 22 under the following condition.

(First Condition)

When the lens design data of the spectacle lens to be edged cannot be acquired, namely when the lens design data of the lens to be edged is not registered in the data server 24, the edging control terminal 23 outputs the first command signal to the lens edger 22. Thus, the calculation switching section 22g of the lens edger 22 sets the flag at "0", namely switches the setting of the calculating section so as to select the first calculating section 22d for calculating the edging shape data. Further, when the lens design data of the spectacle lens to be edged can be acquired, namely when the lens design data of the lens to be edged is registered in the data server 24, the edging control terminal 23 outputs the second command signal to the lens edger 22. Thus, the calculation switching section 22g of the lens edger 22 sets the flag at "1", namely switches the setting of the calculating section so as to select the second calculating section 23b for calculating the edging shape data.

In this case, the terminal control section 23e confirms whether the lens design data is registered in the data server 24, or outputs the command signal to the lens edger 22. Thus, in the lens edger 22, setting of the calculation body for calculating the edging shape data is switched, depending on whether or not the lens design data of the spectacle lens to be edged is registered in the data server 24.

When the spectacle lens of its own company is edged by the lens maker having the edging center 2, the lens design data can be registered in the data server 24. However, when the spectacle lens of other maker is edged, the lens design data cannot be registered in the data server 24. This is because the lens design data is managed by each lens maker as secret information (knowhow). Therefore, substantially, when the spectacle lens of other maker is edged, the first command signal is outputted to the lens edger 22 from the edging control terminal 23, and when the spectacle lens of its own maker is edged, the first command signal is outputted to the lens edger 22 from the edging control terminal 23.

(Second Condition)

When the shape of the surface of the spectacle lens to be edged is a spherical surface, the edging control terminal 23 outputs the first command signal to the lens edger 22. Thus, the calculation switching section 22g of the lens edger 22 sets the flag at "0", namely switches the setting of the calculating section so as to select the first calculating section 22d for calculating the edging shape data. Also, when the shape of the surface of the spectacle lens to be edged is a shape other than the spherical surface, the lens edger 23 outputs the second command signal to the lens edger 22. Thus, the calculation switching section 22g of the lens edger 22 sets the flag at "1", namely switches the setting of the calculating section so as to select the second calculating section 23b for calculating the edging shape data.

In this case, the kind of the lens to be edged can be confirmed using the spectacle lens information included in the order reception data registered in the data server 24. Further, the terminal control section 23e confirms whether the kind of the spectacle lens is a spherical lens or an aspherical lens, and outputs the command signal to the lens edger 22. Thus, in the lens edger, 22, the setting of the calculation body for calculating the edging shape data is switched, according to the kind of the spectacle lens to be edged.

(Third Condition)

When the tilt angle of the spectacle frame to be framed, is less than a specific angle (for example 10 degrees), the edging control terminal 23 outputs the first command signal to the lens edger 22. Thus, the calculation switching section 22g of the lens edger 22 sets the flag at "0", namely switches the setting of the calculating section so as to select the first calculating section 22d for calculating the edging shape data. Also, when the tilt angle of the spectacle frame to be framed, is the specific angle or more, the edging control terminal 23 outputs the second command signal to the lens edger 22. Thus, the calculation switching section 22g of the lens edger 22 sets the flag at "1", namely switches the setting of the calculating section so as to select the second calculating section 23b for calculating the edging shape data.

In this case, the terminal control section 23e of the edging control terminal 23 confirms the tilt angle of the spectacle frame in which the lens is settled, and outputs the command signal to the lens edger 22. Thus, in the lens edger 22, the setting of the calculation body for calculating the edging shape data is switched, according to the tilt angle of the spectacle frame in which the lens is settled.

Figure 9:
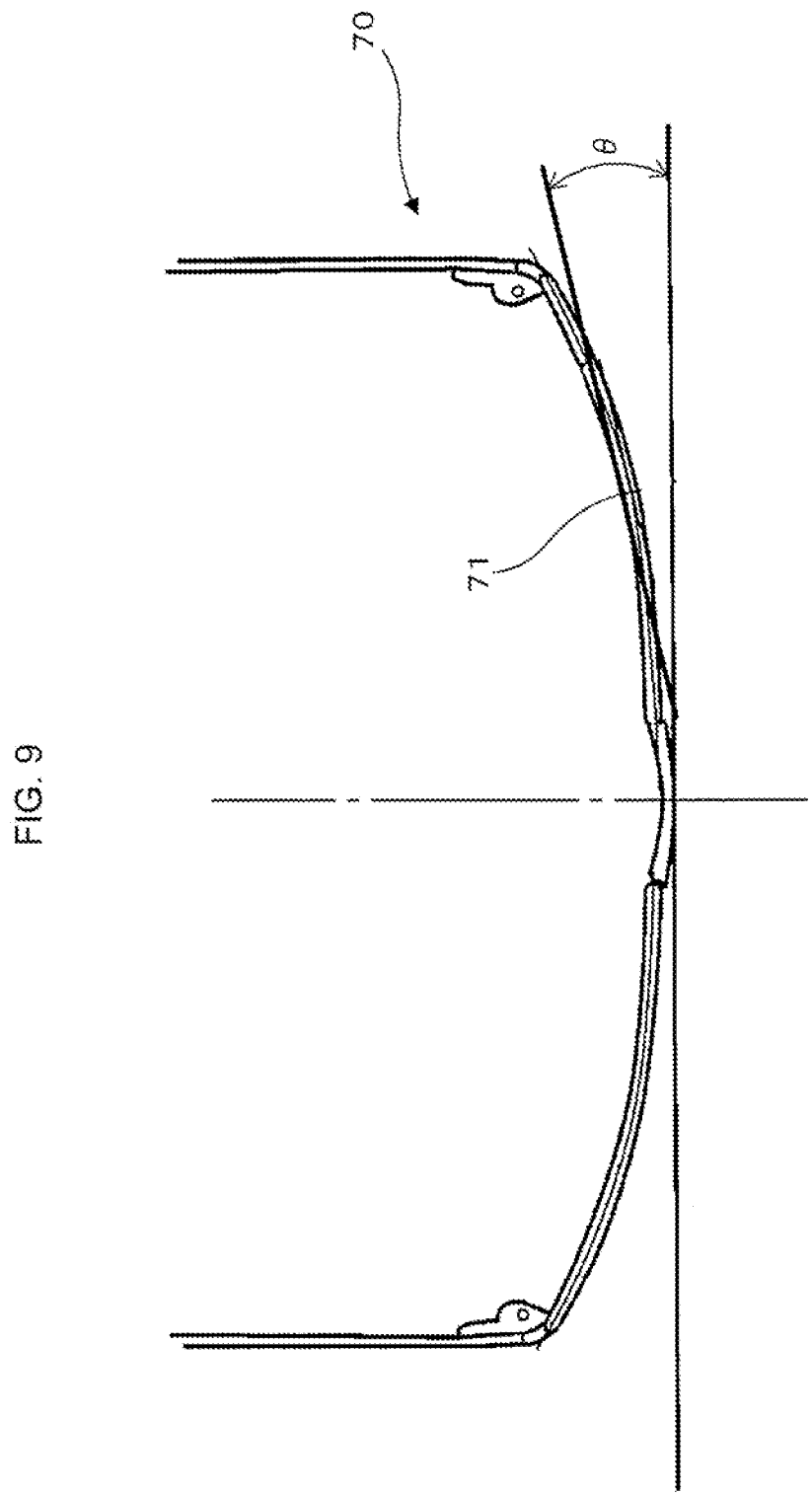
FIG. 9 is a view showing a tilt angle of a spectacle frame.

As shown in FIG. 9, the tilt angle of the spectacle frame is an inclination angle θ of a rim 71 when a spectacle fame 70 is viewed from the upper side.

Data regarding the tilt angle of the spectacle frame belongs to the abovementioned spectacle frame information, but is the data required for edging the spectacle lens. Therefore, the data regarding the tilt angle is not included in the spectacle frame information in some cases. Further, frame shape data belonging to the spectacle frame information is not necessarily provided in a form of three-dimensional data, and is provided in a form of two-dimensional data in some cases. Specifically, the frame shape data obtained by measuring a shape of a flat plate pattern by a tracer, instead of the spectacle frame, is the two-dimensional data.

In this case, similarly to a case that the tilt angle is less than the specific angle, the first command signal may be outputted to the lens edger 22.

Here, the reason for changing the command signal outputted to the lens edger 22 will be described, based on large/small of the tilt angle of the spectacle frame.

First, when the spectacle lens edged in accordance with the frame shape of the spectacle frame, is settled in the spectacle frame, right and left spectacle lenses are tilted to a sight line of a spectacle wearer in a case of a front view, in accordance with the tilt angle. Then, deviation is generated between an optical center distance of the right and left spectacle lenses and an interpupillary distance included in the prescription information, which are caused by the inclination. In this case, if the spectacle lens is settled in the spectacle frame with a large tilt angle (such as a spectacle frame used for sports), the deviation between the optical center distance and the interpupillary distance becomes large.

In order to correct such a deviation, there is a necessity for calculating the edging shape data (finish edging shape data) in consideration of the tilt angle of the spectacle frame, and the lens design data is required for the calculation. Therefore, when the tilt angle is the specific angle or more, the second command signal is outputted to the lens edger 22 from the edging control terminal 23.

Meanwhile, when the spectacle lens is settled in the spectacle frame with a small tilt angle, the deviation between the optical center distance and the interpupillary distance becomes small. If the deviation is small so that the view of the spectacle wearer is not influenced thereby, there is no necessity for calculating the edging shape data in consideration of the tilt angle. Therefore, when the tilt angle is less than the specific angle, the first command signal is outputted to the lens edger 22 from the edging control terminal 23.

Next, confirmation of the switch of setting S2 is performed. This step is performed by the lens edger 22. Specifically, the lens edger 22 confirms which of the first calculating section 22d and the second calculating section 23b is selected as the calculation body for calculating the edging shape data. Then, if the first calculating section 22d is selected as the calculation body for calculating the edging shape data, the lens edger 22 judges the setting as Yes, and if the second calculating section 23b is selected as the calculation body for calculating the edging shape data, the lens edger 22 judges the setting as No.

Next, rough edging shape data is calculated. Specifically, as a result of the confirmation of the switch of setting S2, the rough edging shape data is calculated by the first calculating section 22d when the first calculating section 22d is selected as the calculation body for calculating the edging shape data (S3).

Also, as a result of the confirmation of the switch of setting S2, the rough edging shape data is calculated by the second calculating section 23b, using the calculating information acquired by the calculating information acquisition section 23a, when the second calculating section 23b is selected as the calculation body for calculating the edging shape data (S4, S5). In this case, the lens edger 22 requests the edging control terminal 23 to calculate the rough edging shape data, and when such a request is received, the edging control terminal 23 calculates the rough edging shape data.

The abovementioned spectacle frame information, spectacle lens information, layout information, prescription information, block position information, and edger information, etc., are used for calculating the rough edging shape data. In the calculation of the rough edging shape data by the first calculating section 22d, information required for the calculation is read from the data server 24 by the data acquisition section 22f. Regarding the edger information, the information stored in the edger information memory section 22e is used.

Meanwhile, in the calculation of the rough edging shape data by the second calculating section 23b, the information required for the calculation is read from the data server 24 by the calculating information acquisition section 23a. Regarding the edger information, the information previously sent to the edging control terminal 23 from the lens edger 22 is used. Specifically, the edger information may be sent to the edging control terminal 23 from the lens edger 22, in a stage when data communication is enabled via the communication line 28 between the lens edger 22 and the edging control terminal 23. Also, the lens design data is used for the calculation of the rough edging data by the second calculating section 23b. Regarding the lens design data, it is acquired by the calculating information acquisition section 23a as follows. Namely, lens specifying information is generated using the order reception data registered in the data server 24, and the lens design data registered therein so as to correspond to the lens specifying information is read from the data server 24. The information acquired by the calculating information acquisition section 23a is stored in the calculating information memory section 23f, and the rough edging shape data is calculated by the second calculating section 23b using the stored information. Further, the rough edging shape data calculated by the second calculating section 23b is registered in the data server 24 by the data registration section 23c, so as to correspond to the job identification information.

When the rough edging shape data is calculated by the second calculating section 23b, for example, the following merit can be obtained.

When the spectacle lens (uncut lens) is set in the lens edger 22 and edging is applied thereto, the spectacle lens mounted on the lens holder is supported by adding a pressure thereon so as to sandwich the lens from both sides of a convex surface and a concave surface. If the tilt angle of the spectacle frame to be framed becomes large, the influence thereof cannot be ignored. Specific explanation is given hereafter.

Usually, a position where the lens to be edged is mounted on the lens holder, is set at a two-dimensionally viewed frame center position of the frame shape. At this time, an optical center of the lens to be edged with respect to the center position of the lens holder, is required to be laid-out so that the optical center of the lens to be edged is positioned on the sight line of the spectacle wearer. In a case of an actual layout, decentration (DX) in the X-direction (horizontal direction) between the lens to be edged and the lens holder can be obtained by the following formula, from a lens width (Asize) of the spectacle frame and a nose width (DBL), and the interpupillary distance (PD).

$$DX=(PD \div 2)-(DBL \div 2)-(A\text{size} \div 2)$$

However, the abovementioned formula indicates a case of a simple model in which the tilt angle θ (see FIG. 9) of the spectacle is expressed by θ=0 degree, and the convex surface of the spectacle lens is used as a flat surface. The calculation by the above formula is performed in the calculation by the lens edger 22 which has no calculation parameter such as a tilt angle θ and a lens curve, etc.

Meanwhile, according to a more accurate formula when the tilt angle θ and the lens curve are given in numerical values, the decentration (DX) can be obtained by the following formula wherein protrusion of the lens convex surface is expressed by F.

$$DX=(PD \div 2)-(DBL \div 2)-(A\text{size} \div 2) \times \cos \theta + F \times \sin \theta$$

Here, when the tilt angle is expressed by tilt angle θ=0 degree, the formula is the same as described above. Namely, when the tilt angle θ is small, the influence thereof can be ignored, but when the tilt angle θ is large, the influence thereof cannot be ignored. After the lens to be edged is fitted to the lens edger 22, the block position cannot be corrected, and therefore the layout by the tilt angle θ is corrected only by deforming the lens shape in the X-direction. Accordingly, in a case of the shape of the spectacle frame with a large tilt angle θ, the influence of the tilt angle cannot be ignored.

Next, the lens edger 22 performs rough edging for edging the spectacle lens using the rough edging shape data (S7), after the rough edging shape data calculated by the first calculating section 22d or the second calculating section 23b is acquired by the data acquisition section 22f (S6). When the rough edging shape data is calculated by the first calculating section 22d, the first calculating section 22d calculates edging locus data for rough edging using the rough edging shape data, and based on the edging locus data, the lens edger control section 22h controls drive of the lens edging section 22a. Thus, the lens edging section 22a applies rough edging to the spectacle lens, using the rough edging shape data calculated by the first calculating section 22d. Further, when the rough edging shape data is calculated by the second calculating section 23b, the rough edging shape data is acquired from the data server by the lens edger 22. Specifically, the data acquisition section 22f of the lens edger 22 accesses the data server 24 using the job identification information generated by reading the barcode. At this time, the data acquisition section 22f reads the rough edging shape data registered in the data server 24 so as to correspond to the job identification information, and transfers the rough edging shape data to the first calculating section 22d. Then, the first calculating section 22d calculates the edging locus data for rough edging using the rough edging shape data received from the data acquisition section 22f, and based on the edging locus data, the lens edger control section 22h controls drive of the lens edging section 22a. Thus, the lens edging section 22a applies rough edging to the spectacle lens using the rough edging shape data calculated by the second calculating section 23b.

Next, the lens edger 22 confirms the setting of the calculation body for calculating the edging shape data (S8). As a result of the confirmation, when the first calculating section 22d is selected as the calculation body for calculating the edging shape data (in a case of Yes), shape data for measuring the edge shape is calculated by the first calculating section 22d (S9). Also, as a result of the confirmation, when the second calculating section 23b is selected as the calculation body for calculating the edging shape data (in a case of No), the calculating information acquisition section 12a acquires the information required for calculating the shape data for measuring the edge shape, and using the acquired information, the second calculating section 23b calculates the shape data for measuring the edge shape (S10, S11). At this time, the second calculating section 23b calculates the shape data for measuring the edge shape using the lens design data of the spectacle lens to be edged. Also, the data registration section 23c registers the shape data for measuring the edge shape calculated by the second calculating section 23b, in the data server 24, so as to correspond to the job identification information. The shape data for measuring the edge shape is the data for indicating a measurement position when the edge shape of the spectacle lens 3 is measured by the edge shape measurement section 22c, and further specifically is the data for indicating the shape (position) of the locus S to be traced by a pair of probes 51 and 52 when measuring the edge shape as shown in FIG. 5.

When the shape data for measuring the edge shape is calculated by the second calculating section 23b, for example, the following merit can be obtained when treating a double focus lens.

Namely, there is a portion (near portion) called a segment in the double focus lens. The segment portion structurally protrudes, to thereby obtain a refractive index suitable for a near vision, and there is a step in an upper edge of the protruded portion. Therefore, there is a problem that the probes 41 and 52 are hooked by the step when tracing the segment portion by the probes 51 and 52. Meanwhile, in a case of having the lens design data, the position of the segment portion of the spectacle lens can be accurately specified based on the lens design data. Therefore, when the shape data for measuring the edge shape is calculated by the second calculating section 23b, the shape data for measuring the edge shape can be calculated so as to trace a lens optical surface by the probes 51 and 52, detouring the segment portion. Accordingly, a situation that the probes are hooked by the step of the segment portion can be prevented.

Next, in the lens edger 22, the shape data for measuring the edge shape calculated by the second calculating section 23b is acquired from the data server 24 by the data acquisition section 22f (S12). However, when the first calculating section 22d calculates the shape data for measuring the edge shape, there is no necessity for acquiring the shape data for measuring the edge shape from the data server 24. Next, in the lens edger 22, the edge shape measurement section 22c measures the edge shape using the shape data for measuring the edge shape (S13). Specifically, the edge shape is measured in accordance with the locus S indicated by the shape data for measuring the edge shape (see FIG. 5). In FIG. 5, an outer shape of the spectacle lens 30 is circularly drawn. However, the edge shape is measured for the spectacle lens 30 after rough edging, and therefore the lens shape during measurement is one size larger than a final finish shape.

Next, in the lens edger 22, the setting of the calculation body for calculating the edging shape data is confirmed (S14). As a result of the confirmation, when the first calculating section 22d is selected as the calculation body for calculating the edging shape data (in the case of Yes), the first calculating section 22d calculates the finish edging shape data using the edge shape measurement data obtained by measuring the edge shape (S15). Also, as a result of the confirmation, when the second calculating section 23b is selected as the calculation body for calculating the edging shape data (in the case of No), the edge shape measurement data obtained by measuring the edge shape is outputted to the edging control terminal 23 (S16). Then, in the edging control terminal 23, after the edge shape measurement data outputted from the lens edger 22 is acquired (received) by the calculating information acquisition section 23a (S17), the second calculating section 23b calculates the finish edging shape data using the edge shape measurement data (S18). The abovementioned spectacle frame information, spectacle lens information, layout information, prescription information, block position information, edger information, and lens design data are used for calculating the finish edging shape data, other than the edge shape measurement data. In this step, the finish edging shape data calculated by the second calculating section 23b is registered in the data server 24 by the data registration section 23c so as to correspond to the job identification information. Also, the second calculating section 23b calculates a theoretical circumference together with the finish edging shape data, and the data registration section 23c registers the theoretical circumference in the data server 24 together with the finish edging shape data, so as to correspond to the job identification information. The theoretical circumference is included in numerical data calculated based on a circumference calculation program (not shown) possessed by the second calculating section 23b. The theoretical circumference is calculated as the circumference of the spectacle lens which is preferable from a viewpoint of improving a fitting rate when the spectacle lens that has already undergone the finish edging is settled in the spectacle frame. Accordingly, an optimal edging state is the state in which the circumference of the spectacle lens after edging coincides with the theoretical circumference.

Next, in the lens edger 22, finish edging (including beveling) is applied to the spectacle lens, using the finish edging shape data calculated by the first calculating section 22d or the second calculating section 23b (S20). When the finish edging data is calculated by the first calculating section 22d, the edging locus data for finish edging is calculated by the first calculating section 22d using the finish edging data, and based on the edging locus data, the lens edger control section 22h controls the drive of the lens edging section 22a. Thus, in the lens edging section 22a, finish edging is applied to the spectacle lens using the finish edging shape data calculated by the first calculating section 22d. Also, when the finish edging shape data is calculated by the second calculating section 23b, the finish edging shape data is acquired from the data server 24 by the data acquisition section 22f of the lens edger 22 before applying the finish edging (S19). Specifically, the data acquisition section 22f of the lens edger 22 accesses the data server 24 using the identification information generated by reading the barcode. At this time, the data acquisition section 22f reads the finish edging shape data registered in the data server 24 so as to correspond to the job identification information, and transfers the finish edging shape data to the first calculating section 22d. Then, the first calculating section 22d calculates the edging locus data for finish edging using the finish edging shape data received from the data acquisition section 22f, and based on the edging locus data, the lens edger control section 22h controls the drive of the lens edging section 22a. Thus, the lens edging section 22a applies finish edging to the spectacle lens, using the finish edging shape data calculated by the second calculating section 23b.

Next, post-steps (S21 to S23) are performed. These steps are broadly divided into two steps. In the first step, the circumference measurement machine 25 measures the circumference of the spectacle lens that has undergone the finish edging by the lens edger 22 (S21). The circumference (called an "actual measurement circumference" hereafter) of the spectacle lens measured by the circumference measurement machine 25 is registered in the data server 24 so as to correspond to the job identification information.

Next, processing for correcting the edging condition is performed when the second calculating section 23b calculates the edging shape data in step S18 (S23) (in the case of Yes in S22). Namely, when the actual measurement circumference is registered in the data server 24 as described above, the circumference management section 23d reads the actual measurement circumference from the data server 24 under instruction of the terminal control section 23e. Next, the circumference management section 23d judges whether the edging condition for applying edging is required to be corrected, based on the theoretical circumference calculated by the second calculating section 23b and the actual measurement circumference read from the data server 24. Specifically, the circumference management section 23d obtains a difference between the theoretical circumference and the actual measurement circumference, and so judges that the difference of circumference is not required to be corrected if it is in a previously set specific range, and so judges that the difference of circumference is required to be corrected if it exceeds the specific range. The specific range is set in a narrower range than an allowable range so that the circumference of the edged spectacle lens falls within the allowable range. Further, the circumference management part 23d obtains a circumference corrected value used for correcting the abovementioned edging condition, when it is so judges that the edging condition must be corrected. The circumference corrected value may be reflected on the edging condition for applying edging, so that the actual measurement circumference approximates the theoretical circumference. Specifically, for example, a circumference correction value may be reflected as one of the calculation parameters used for calculating the edging shape data by the second calculating section 23b.

In the above description, the edge shape is measured after rough edging. However, the edge shape may be measured before rough edging. In this case, calculation of the rough edging shape data and calculation of the finish edging shape data may be performed together before rough edging. However, difference is sometimes generated in the edge shape measurement data between the lens before rough edging and the lens after rough edging, due to a deformation, etc., of the lens before/after rough edging, even if the edge shape is measured in the same locus. Therefore, in order to make an edging error small, due to the deformation, etc., of the lens before/after rough edging, the edge shape is preferably measured in a state when the rough edging is ended.

8. Effect of an Embodiment

According to an embodiment of the present invention, the data acquisition section 22f and the calculation switching section 22g are provided in the lens edger 22, and when the calculation switching section 22g switches the setting of the calculation body so as to select the second calculating section 23b for calculating the edging shape data, the second calculating section 23b acquires the calculated edging shape data by the data acquisition section 22f, and the lens edging section 22a applies edging processing using the acquired edging shape data. Therefore, even in a case of constructing the edging system 4 in the edging center 2 using the lens edger 22 having the first calculating section 22d and the edging control terminal 23 having the second calculating section 23b, the edging shape data can be calculated using the edging calculation function of the second calculating section 23b, and by using the edging shape data thus obtained, edging can be applied to the spectacle lens by the lens edger 22.

Further, even in a case that lens edgers 22 of different lens edger makers are provided and coexist in the edging center 2, or even in a case that lens edgers 22 of different models of the same lens edger maker are provided and coexist in the edging center 2, edging processing can be applied to the spectacle lens by each lens edger 22, using the edging shape data calculated by the edging control terminal 23. Accordingly, the spectacle lens can be edged in a desired finish shape, irrespective of the maker and the model of the lens edger 22.

As a result, for example, even in a case that the lens edger 22 provided by a maker exclusive for lens edgers is used in the edging system 4 realized by the lens maker, a high fitting rate can be realized. This point is more specifically described.

First, when the spectacle lens after edging is settled in the spectacle frame, the fitting rate indicates a probability of a normal settling of a lens in a spectacle frame. As an abnormal settling of a lens in a spectacle frame, for example, the following cases can be considered: a case that a size (mainly the circumference) of the spectacle lens is too small or too large compared with a frame size of the spectacle frame, and a case that a bevel position is inappropriate.

In order to improve the fitting rate, it is effective to use the lens design data for calculation processing for calculating the edging shape data used for the edging process. The reason is as follows.

Figure 10:
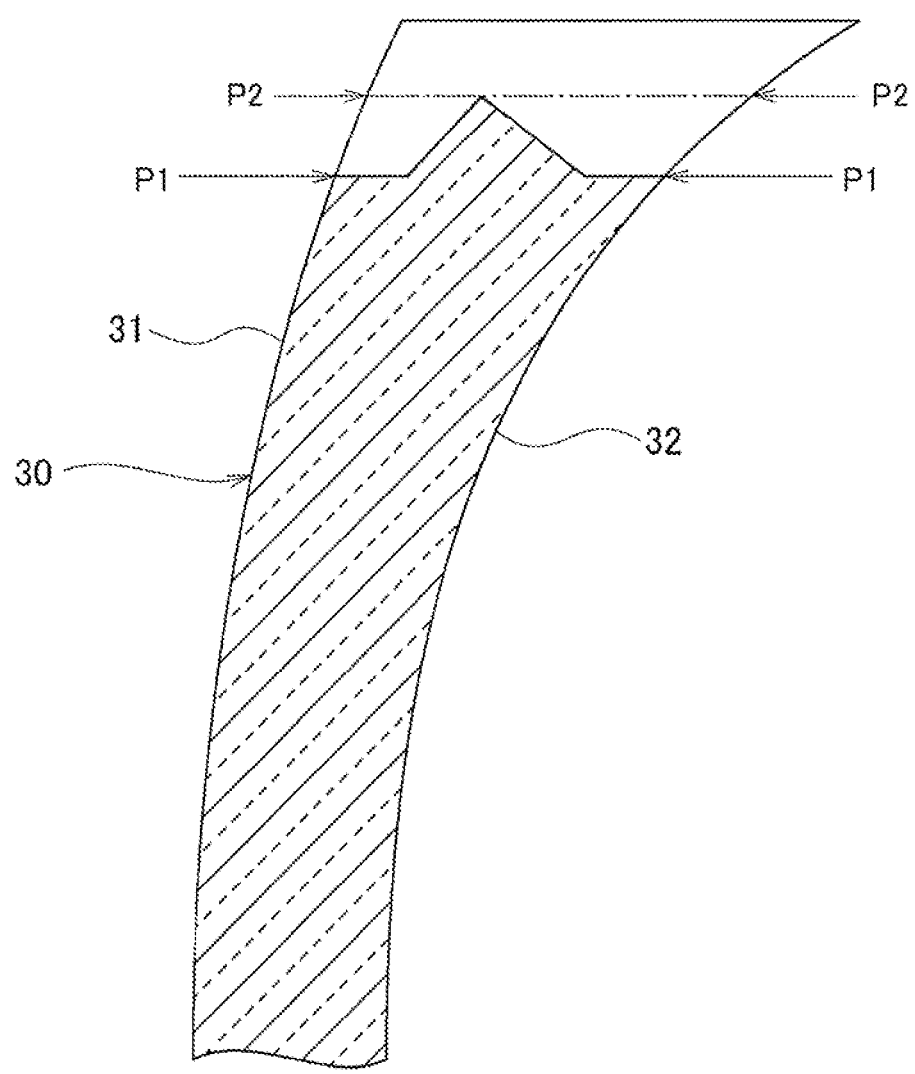
FIG. 10 is a view showing a relation between a finish position and an edge shape measurement position.

First, when the edge shape is measured by the edge shape measurement section 22c, as shown in FIG. 4, a pair of probes 51 and 52 are brought into contact with optical surfaces 31 and 32 of the spectacle lens 30, to thereby perform tracing. At this time, scratches are formed on the optical surfaces 31 and 32 of the spectacle lens 30 along the locus S traced by the probes 51 and 52. If the scratches are remained on the finished spectacle lens 30, this is a defective lens in terms of quality. Therefore, a contact position of the pair of the probes 51 and 52 when measuring the edge shape, is set to a position removed in a finish edging performed thereafter. Specifically, as shown in FIG. 10, this position is set at a position (called an "edge shape measurement position" hereafter) outside of a position of an outer edge of the lens (called a "finish position" hereafter) P1, thereby defining a final finish shape. Therefore, when finish edging shape data used for the finish edging including bevel edging is calculated, an actual edge shape at the finish position P1 needs to be estimated, based on the edge shape measurement data measured at the edge shape measurement position P1. This is because a bevel position is determined, with the finish position P1 as a reference.

However, for example, when the spectacle lens 30 to be edged is the lens having a surface in which curvature is continuously varied in a part or the whole part of the surface of the lens such as a progressive power lens, the optical surfaces 31 and 32 of the spectacle lens 30 having specific curvature respectively, are continuously varied from the edge shape measurement position P2 to the finish position P1. Therefore, the edge shape (including the edge thickness, etc.) at the finish position P1 cannot be precisely estimated, if there is no lens design data, and error is generated in an estimation result. If the error is generated in the estimation result of the edge shape, the finish edging shape data is calculated, in a form of including the error. Therefore, deviation is generated in a final finish shape and a bevel position of the spectacle lens, thus causing a low fitting rate. Meanwhile, when there is the lens design data, the edge shape can be precisely estimated at the finish position P1 using surface shape data, etc., of each optical surface 31, 32 included in the lens design data. Therefore, almost no abovementioned error is generated. Accordingly, when the lens design data is used, higher fitting rate can be obtained, compared with a case of not using the lens design data.

Further, use of the lens design data for calculating the edge shape data, is effective for providing an optimal spectacle to a client. Specifically, the following cases can be given for example: a case that a thinner (lighter) spectacle lens is requested, a case that small difference in mass of the right and left spectacle lenses is requested, or a case that lens curves of the right and left spectacle lenses are balanced. In this case, optimization of a lens thickness, balance of right and left curve and weight of the lens, and selection of the lens curve in consideration of a frame curve, are performed by calculation using the lens design data, and thereafter the edging shape data is obtained by calculating the deformation of the frame shape of the spectacle frame, or calculating a bevel curve and the circumference, etc. Such a calculation for optimization is performed for a so-called custom-made lens. However, the calculation of the edging shape data using the lens design data can be applied to not only the custom-made lens, but also a lens in stock.

Further, in the edging system 4 of this embodiment, introduction of the lens edger 22 having the abovementioned structure, is meaningful in the following point for example.

In recent years, in order to suppress an edging cost required for the spectacle lens, an edging source such as a lens edger, etc., is integrated in a developing country where a labor cost is low, and an ordering system is employed in which order data is received there from a spectacle shop of each country in the world, and the spectacle lens after edging is supplied to an order source. In employing such a global ordering system, it is considerably important to make the spectacle lens edged in accordance with the frame shape of the spectacle frame, settle in its spectacle frame normally. This is because when the spectacle shop at an ordering side and the edging center at an order receiving side exist in different countries, it is difficult to speedily cope with a case when failure occurs in settling a lens in a spectacle frame.

Further, in a case of a different maker and a different model of the tracer installed in each spectacle shop, an individual difference of each tracer appears as an edging error of the spectacle lens. In order to prevent a generation of such an edging error, for example, a correction value is prepared for each tracer of different maker or model in the abovementioned edging system 4, and an influence of the individual difference of the tracer may be solved by correcting the frame shape data, which is sent as a measurement result of each tracer, by the abovementioned correction value (for example, see International. Patent Publication No. 2007/077848).

However, even if the abovementioned correction mechanism is employed, a difference is generated in the final finish shape of the spectacle lens even if the same order reception data is used, if the edging shape data is calculated by the lens edger based on a calculation program incorporated in this lens edger and edging is applied to the spectacle lens by using this edging shape data. This is because the edging shape calculation program incorporated in the lens edger is different depending on the maker and the model of the lens edger. Further, the edging shape calculation program is developed for each lens edger maker. Therefore, when edging is applied to the spectacle lens to be settled in a certain spectacle frame, there is a reference defined individually by each maker, regarding an ideal finish shape of the spectacle lens for settling in the frame, and particularly regarding the place on an edge surface of the spectacle lens for forming a bevel and a curve of the bevel. Therefore, it is unpractical to share the edging shape calculation program incorporated in the lens edger, between the lens maker and the lens edger maker, or among a plurality of lens edger makers.

Accordingly, in the spectacle lens edged by the lens edger manufactured by the lens edger maker, a uniform finish shape cannot be obtained depending on the difference of the maker and model, etc. Further, although the specification of the edging shape calculation program is preferably the specification using lens design data for the reason described above, the edging shape calculation program incorporated in the lens edger of the lens edger maker (excluding a lens maker) is not based on such a specification. This is because the lens design data is the data possessed by the lens maker as knowhow, and it is practically improbable that the lens edger maker which is not the lens maker develops the edging shape calculation program based on the specification in which the lens design data is used. Accordingly, at present, when the spectacle lens is edged into a desired finish shape by the lens maker, there is no choice but construct a lens edging system using the lens edger manufactured by its own company of the lens maker.

However, in the abovementioned global ordering and order receiving system, if all lens edgers installed in the edging center are manufactured by its own company of the lens maker, and maintenance and management are also performed thereafter by its own company of the lens maker, a lot economic and personnel burdens are imposed on the lens maker. Therefore, it can be considered that the lens edging system is constructed in such manner that the lens edger manufactured and used by its own company of the lens maker is replaced by the lens edger manufactured by the lens edger maker (excluding the lens maker). In such a lens edging system, as described above, an unconventional unique system can be constructed, in which both of the lens edger 22 and the edging control terminal 23 have individual edging calculation function respectively. Then, when such a unique system is employed, a new subject is generated such that the difference is generated in the finish shape of the spectacle lens depending on the difference of the edging shape calculation program between the lens edger 22 and the edging control terminal 23. Further, in order to solve such a subject, even if the lens edger in which the edging shape calculation program is incorporated so as to conform to the specification of the lens maker, is manufactured by an edger maker which is requested to manufacture the lens edger from the lens maker, and the lens edger thus manufactured can be installed in the edging center of the lens maker, there is a problem as follows. Namely, if the edging shape calculation program is developed by the lens edger maker based on the specification of the lens maker, there is a risk of a leak of data to the edger maker, regarding the data managed by the lens maker as knowhow. Further, if the lens edger is developed and manufactured by the edger maker based on the specification of the lens maker, the cost of the lens edger is increased. Therefore, there is a less merit of introducing the lens edger by the lens maker, the lens edger being produced by other maker. Further, when the maker of the lens edger introduced to the edging center is changed, or when a plurality of lens edgers of different maker and different model are provided to coexist and installed in the edging center, there is a necessity for managing a version of the calculation program for each maker and each model of the lens edger. Therefore, management in the edging center is complicated.

Regarding the abovementioned point, according to this embodiment, the abovementioned edging system 4 can be realized by adding the data acquisition section 22f and the calculation switching section 22g to a section (lens edging section 22a, operation panel 22b, edge shape measurement section 22c, first calculating section 22d, and edger information memory section 22e) which is usually provided in the lens edger 22 of the lens edger maker. Thus, even when the lens edger of other maker (such as edger maker) is used, the spectacle lens can be edged into a finish shape equivalent to the shape in the case of using the lens edger manufactured by its own company. When the edging shape data is calculated by the second calculating section 23b, version management, etc., of the calculation program may be performed not for each lens edger 22, but for the edging control terminal 23. Therefore, when the edging shape data used by a plurality of lens edgers 22 is calculated by one edging control terminal 23, the management in the edging center 2 can be simplified.

When the lens edger of other maker is introduced by the lens maker so that the abovementioned edging system 4 is constructed, a mechanism of access restriction may be employed, so that the lens edger 22 cannot access the lens design data registered in the data server 24, to prevent the leak of the knowhow of the lens maker. Further, regarding the edging shape data acquired by the data acquisition section 22f of the lens edger 22 (particularly finish edging shape data), a mechanism of forcibly (automatically) deleting the data from the memory, etc., of the lens edger 22 may be employed, in a stage when finish edging by the lens edging section 22a is ended. Also, a system structure may be employed, in which authentication processing is performed between the edging control terminal 23 and the lens edger 22 when the lens edger 22 is newly connected to the communication line 28 to which the edging control terminal 23 is connected, and the edging shape data, etc., calculated by the edging control terminal 23 is provided only to the lens edger 22 that succeeds in this authentication.

9. Other Embodiment

In the abovementioned embodiment, when the calculation body is selected as the second calculating section 23b for calculating the edging shape data, data other than the edging shape data is also calculated by the second calculating section 23b. However, the present invention is not limited thereto. Namely, not only the edging shape data directly used for edging, but also each kind of calculation item such as the shape data for measuring the abovementioned edge shape for example, is included in the calculation items regarding edging. In such a case, the setting of the calculating section is switched so as to select the first calculating section 22d and the second calculating section 23b for calculating the edging shape data used for at least edging. However, there is no necessity for calculating the other data (excluding the edging locus data) by the same calculation body as the calculation body for calculating the edging shape data. Namely, the edging shape data and the other data can be calculated by different calculating sections, in each kind of the calculation items regarding edging. More detailed explanation is given hereafter.

First, the calculation switching section 22g of the lens edger 22 is configured to switch the setting of the calculation body so as to select either one of the first calculating section 22d and the second calculating section 23b for calculating the edging shape data, and also switch the calculation body so as to select either one of the first calculating section 22d and the second calculating section 23b for calculating the data other than the edging shape data, according to a content in each kind of step in the edging process of the spectacle lens. For example, when the setting of the calculation body is switched so as to select the second calculating section 23b for calculating the edging shape data, the calculation switching section 22g is configured to switch the setting of whether or not using the first calculating section 22d for calculating the shape data for measuring the edge shape. Specifically, the calculation switching section 22g adds an option of whether or not using the first calculating section 22d for calculating the data other than the edging shape data, as the option for setting calculation body as the second calculating section 23b for calculating the edging shape data. This case can be responded by increasing the number of hard switches from two to three when the setting of the calculation body is switched by the hard switch using the operation panel 22b, and can be responded by increasing a flag pattern from two to three when the calculation body is switched by a soft switch.

Thus, the calculation switching section 22g can switch the calculation body so as to select any one of (1) a case of setting the calculation body so as to select the first calculating section 22d for calculating the edging shape data, (2) a case of setting the calculation body so as to select the second calculating section 23b for calculating the edging shape data and so as not to select the first calculating section 22d for calculating the data other than the edging shape data, and (3) a case of setting the calculation body so as to select the second calculating section 23b for calculating the edging shape data, and setting the calculation body so as to select the first calculating section 22d for calculating the data other than the edging shape data. Regarding the setting of (1), it can be considered that there are the case of setting the calculation body so as to select the first calculating section 22d for calculating the edging shape data and setting the calculation body so as not to select the second calculating section 23b for calculating the data other than the edging shape data, and the case of setting the calculation body so as to select the first calculating section 22d for calculating the edging shape data and setting the calculation body so as to select the second calculating section 23b for calculating the data other than the edging shape data. Here, explanation is given hereafter for the former case.

When the calculation switching section 22g switches the setting of the calculation body so as to select the first calculating section 22d for calculating the edging shape data, the processing flow is the same as the processing flow in the case of using the lens edger 22 alone. In this case, the first calculating section 22d calculates the edging shape data regarding edging applied to the spectacle lens, including the edging shape data and the other data.

Figure 7:
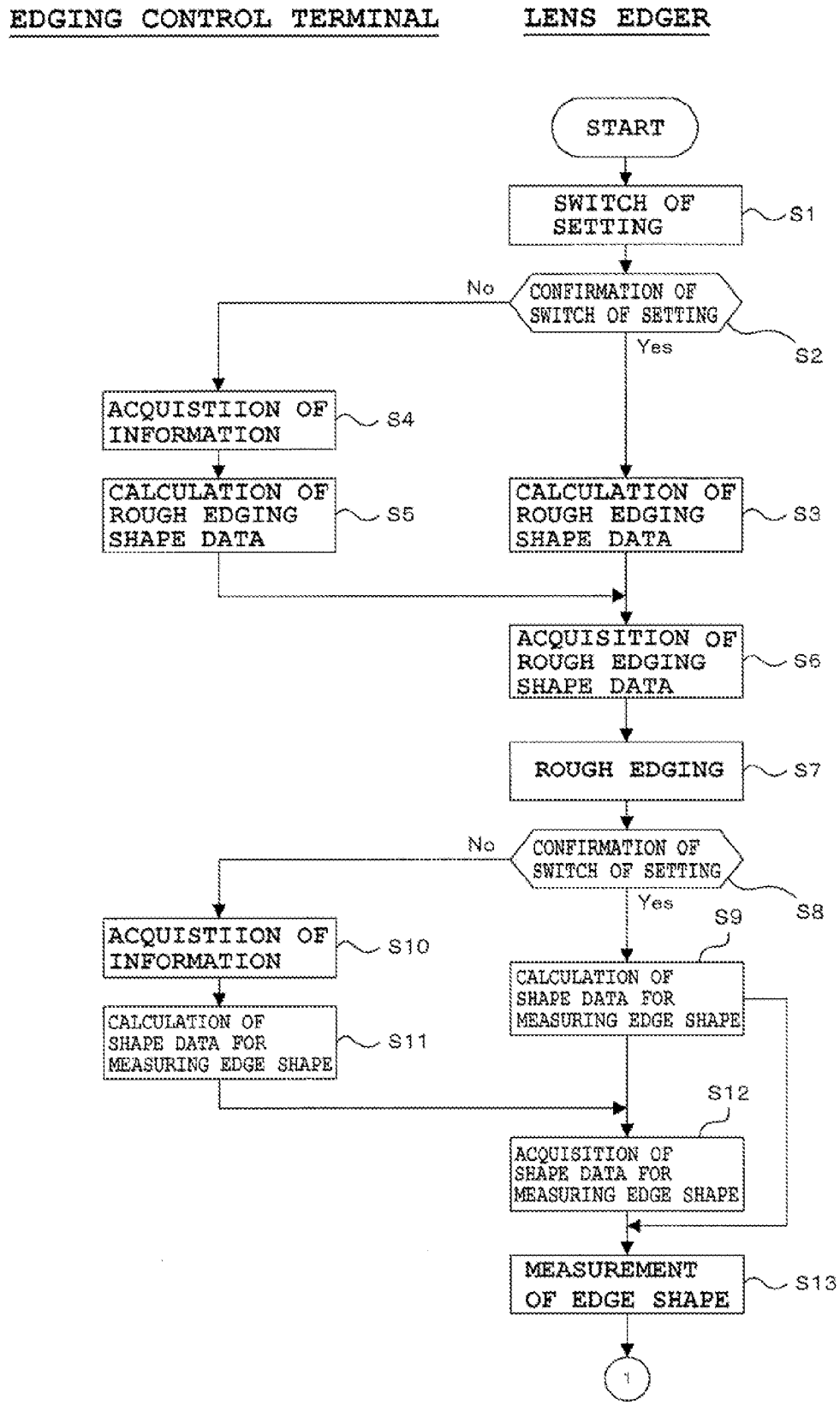
FIG. 7 is a view (1) showing a processing flow of an edging applied to a spectacle lens.
Figure 8:
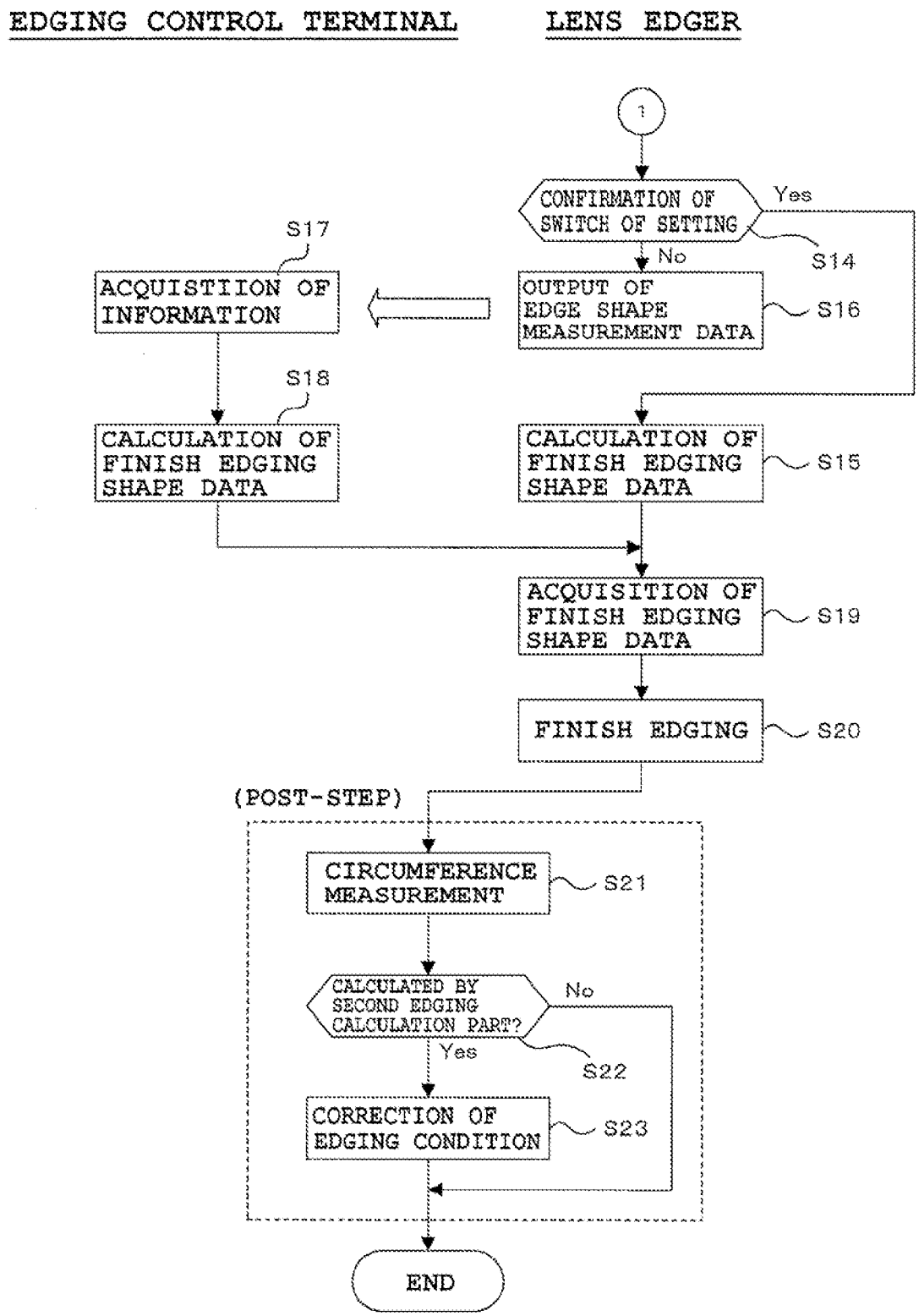
FIG. 8 is a view (2) showing a processing flow of an edging applied to a spectacle lens.

Further, in the case of (2) setting the calculation body so as to select the second calculating section 23b for calculating the edging shape data, and setting the calculation body so as not to select the first calculating section 22d for calculating the data other than the edging shape data, processing is performed sequentially
S1→S2→S4→S5→S6→S7→S8→S10→S11→S12→
S13→S14→S16→S17→S18→S19→S20→S21→
S22→S23 in the abovementioned processing flow (see FIG. 7 and FIG. 8).

Meanwhile, when the calculation switching section 22g switches the setting of the calculation body so as to select the second calculating section 23b for calculating the edging shape data and select the first calculating section 22d for calculating the data other than the edging shape data, processing is performed in the following processing flow. Explanation is given here, for a case that the data other than the edging shape data is the shape data for measuring the edge shape.

First, after confirmation of switch of the setting of the calculation body, in the edging control terminal 23, rough edging shape data is calculated by the second calculating section 23b under an instruction from the terminal control section 23e. The rough edging shape data is calculated without using edger information regarding the lens edger 22 (information such as a shape of a tool provided in the lens edger 22) in the abovementioned various information. In this case, the second calculating section 23b calculates the rough edging shape data using a tool generally used for the lens edger, and the information regarding a shape and a diameter of the tool generally used even in a case of the lens edger of different model, (called "versatile edger information"). The versatile edger information is previously registered in the data server 24 for example, which is then read and acquired from the data server 24 by the calculating information acquisition section 23a. The rough edging shape data calculated by the second calculating section 23b in this step, is registered in the data server 24 by the data registration section 23c, so as to correspond to the job identification information.

As described above, when the rough edging shape data is registered in the data server 24, the data acquisition section 22f accesses the data server 24 in the lens edger 22, for example using the job identification information generated by reading the barcode. At this time, the data acquisition section 22f reads the rough edging shape data registered in the data server 24 so as to correspond to the job identification information, and transfers it to the first calculating section 22d. Then, the first calculating section 22d calculates the edging locus data for rough edging using the rough edging shape data received from the data acquisition section 22f, and based on the edging locus data, the lens edger control section 22h controls the drive of the lens edging section 22a. Thus, in the lens edging section 22a, rough edging is applied to the spectacle lens, using the rough edging shape data calculated by the second calculating section 23b.

Further, the first calculating section 22d calculates the shape data for measuring the edge shape using the rough edging shape data received from the data acquisition section 22f. Such a calculation may be performed before rough edging, or may be performed after rough edging, which is applied to the spectacle lens by the lens edging section 22a. Thus, the first calculating section 22d is used for calculating the data other than the edging shape data. Subsequently, the lens edger control section 22h drives the edge shape measurement section 22c. Thus, the edge shape measurement section 22c measures the edge shape of the spectacle lens. At this time, the edge shape measurement section 22c measures the edge shape using the shape data for measuring the edge shape previously calculated by the first calculating section 22d according to locus S (see FIG. 5) indicated by this data. The edge shape measurement data obtained by this measurement is outputted (provided) to the edging control terminal 23 from the lens edger 22, together with the shape data for measuring the edge shape.

Further, data showing which height is selected for holding the spectacle lens 30 in the edge shape measurement section 22c, is attached to the edge shape measurement data and the shape data for measuring the edge shape outputted to the edging control terminal 23 from the lens edger 22. Specifically, for example, data (called a "central height data" hereafter) showing a central height H (see FIG. 3(b)) at the time of holding the spectacle lens 30 by the lens holder 40 of the lens edger 22 is attached to the shape data. Then, the edge shape measurement data and the shape data for measuring the edge shape are outputted to the edging control terminal 23 from the lens edger 22, together with the central height data. The central height data is stored in the edger information memory section 22e as one of the edger information, and is read from the edger information memory section 22e by the edge shape measurement section 22c or the lens edger control section 22h, and may be provided to the edging control terminal 23. Generally, the central height H at the time of measuring the edge shape of the spectacle lens is different for each maker of the lens edger 22. Therefore, if the edge shape measurement data, the shape data for measuring the edge shape, and the central height data are provided to the edging control terminal 23 as a set, the edge shape (edge thickness, etc.) can be precisely grasped, with a position of a vertex of a lens surface (convex surface) of the spectacle lens specified by the central height data as a reference, even when the edge shape of the spectacle lens is measured by the edge shape measurement section 22c using the lens holder 40, at the edging control terminal 23 side where the above data is received. Thus, error within a standard of a non-defective product generated in manufacturing a spectacle lens, and a tilt of the spectacle lens in a state of being set in the lens edger, can be corrected.

Note that output of the central height data to the edging control terminal 23 together with the edge shape measurement data by the lens edger 22, can be similarly applied in the step S16.

Next, in the edging control terminal 23, the edge shape measurement data, the shape data for measuring the edge shape, and the central height data outputted from the lens edger 22, are acquired (received) by the calculating information acquisition section 23a, and thereafter the second calculating section 23b calculates the edging shape data using the above data. Meanwhile, the lens edger 22 is set in a standby state until the finish edging shape data is acquired from the edging control terminal 23. The step thereafter is similar to the above embodiment, and therefore explanation therefore is omitted.

In the above processing, the edging shape data used for edging is calculated by the second calculating section 23b of the edging control terminal 23, and the shape data for measuring the edge shape corresponding to the data other than the edging shape data is calculated by the first calculating section 22d of the lens edger 22. Thus, a total processing time required for edging can be shortened, compared with a case that both of the edging shape data and the shape data for measuring the edge shape are calculated by the second calculating section 23b. Particularly, when one set of edging control terminal 23 is installed for a plurality of lens edgers 22 in the structure of the edging system 4, the rough edging shape data that can be used by the plurality of lens edgers 22, may be calculated only once by the second calculating section 23b. Further, the shape data for measuring the edge shape can also be calculated by the first calculating section 22d provided in each lens edger 22. Therefore, the time required for calculating the data can be extremely shortened. Also, even when the rough edging is applied to the spectacle lens using the rough edging shape data calculated by using the versatile edger information, finish edging is performed thereafter using the finish edging shape data calculated using the lens design data. Therefore, the processing time can be shortened without deteriorating the precision.

Note that as an application example of the edging system 4 of this embodiment, the calculation switching section 22g of the lens edger 22 may be configured to have following three functions as functions of switching the setting of the calculation body.

(1) Function of switching the setting of the calculation body so as to select either one of the first calculating section 2d and the second calculating section 23b for calculating the rough edging shape data attached to the edging shape data.

(2) Function of switching the setting of the calculation body so as to select either one of the first calculating section 22d and the second calculating section 23b for calculating the finish edging shape data attached to the edging shape data.

(3) Function of switching the setting of the calculation body so as to select either one of the first calculating section 22d and the second calculating section 23b for calculating the data other than the edging shape data.

When such a structure is employed, in the rough edging shape data and the finish edging shape data attached to the edging shape data used for edging, for example the processing can be performed in such a manner that the rough edging shape data and the shape data for measuring the edge shape are calculated by the first calculating section 22d, and the finish edging shape data is calculated by the second calculating section 23b.

DESCRIPTION OF SIGNS AND NUMERALS

22 Lens edger
22a Lens edging section
22b Operation panel
22c Edge shape measurement section
22d First calculating section
22e Edger information memory section
22f Data acquisition section
22g Switching section
22h Lens edger control section
23 Edging control terminal
23a Calculating information acquisition section
23b Second calculating section

The invention claimed is:

1. A lens edging system of a spectacle lens which edges a spectacle lens for settling a lens in a spectacle frame, comprising:
a lens edger having a lens edging section to perform edging, and a first calculating section to obtain edging shape data used for edging by the lens edging section, based on a first calculation program; and
an edging control terminal having a second calculating section to obtain edging shape data used for edging by the lens edging section, based on a second calculation program different from the first calculation program,
wherein the lens edger includes a calculation switching section configured to switch a setting of a calculating section so as to select either one of the first calculating section and the second calculating section for calculating edging shape data used for at least the edging in each kind of calculation items regarding the edging, and a data acquisition section configured to acquire edging shape data calculated by the second calculating section from the edging control terminal when the edging shape data is calculated by the second calculating section,
wherein when the calculation switching section switches the setting of the calculating section so as to select the second calculating section for calculating the edging shape data, the edging shape data calculated by the second calculating section is acquired by the data acquisition section, and the spectacle lens is edged into a desired finish shape, irrespective of a maker or a model of the lens edger, by acquiring the edging shape data by the data acquisition section, the edging shape data being calculated by the second calculating section, and performing edging by the lens edging section using the acquired edging shape data.

2. The edging system of a spectacle lens according to claim 1, wherein the lens edging section performs the edging by rough edging and finish edging, and the first calculating section calculates edging shape data used for the rough edging and the finish edging without using lens design data of the spectacle lens, and the second calculating section calculates edging shape data used for at least the finish edging out of the rough edging and the finish edging, using the lens design data of the spectacle lens.

3. The edging system of a spectacle lens according to claim 1, wherein
the lens edger includes an edge shape measurement section for measuring an edge shape of the spectacle lens, and is configured to output edge shape measurement data obtained by a measurement by the edge shape measurement section, to the edging control terminal, and
the second calculating section of the edging control terminal is configured to calculate the edging shape data using the edge shape measurement data outputted from the lens edger.

4. The edging system of a spectacle lens according to any claim 1, wherein
the lens edger is configured to output edger information to the edging control terminal, as one of the calculating information used for calculating the edging shape data, and
the edging control terminal has a calculating information acquisition section that acquires the edger information outputted from the lens edger as one of the calculating information.

5. The edging system of a spectacle lens according to claim 3, wherein
the second calculating section of the edging control terminal is configured to calculate shape data for measuring an edge shape using lens design data of a spectacle lens to be edged, when the calculation switching section switches a setting of a calculating section so as to select the second calculating section for calculating the edging shape data, and
the lens edger is configured to acquire the shape data for measuring the edge shape calculated by the second calculating section when the calculation switching section switches a setting of a calculating section so as to select the second calculating section for calculating the edging shape data, and measure an edge shape by the edge shape measurement section using the acquired shape data for measuring the edge shape.

6. The edging system of a spectacle lens according to claim 3, comprising a blocker for mounting a lens holder on the spectacle lens so that the spectacle lens is held by the lens holder,
wherein the lens edger outputs central height data showing a central height at the time of holding the spectacle lens by the lens holder, to the edging control terminal together with the edge shape measurement data.

7. The edging system of a spectacle lens according to claim 1, wherein the lens edger has an operation panel for an operator to select either one of the first calculating section and the second calculating section for calculating the edging shape data, and
the calculation switching section is configured to switch a setting of the calculating section so as to select either one of the first calculating section and the second calculating section for calculating the edging shape data, based on a result selected by the operator using the operation panel.

8. The edging system of a spectacle lens according to claim 1, wherein the calculation switching section is configured to switch a setting of a calculating section so as to select either one of the first calculating section and the second calculating section for calculating the edging shape data using at least one of spectacle lens information, spectacle frame information, and prescription information included in order reception data which is used for edging.

9. The edging system of a spectacle lens according to claim 1, wherein the edging control terminal is configured to output a command signal to the lens edger, for giving an instruction to select either one of the first calculating section and the second calculating section for calculating the edging shape data, and
the calculation switching section of the lens edger is configured to switch the calculating section so as to select either one of the first calculating section and the second calculating section for calculating the edging shape data, based on the command signal outputted from the edging control terminal.

10. The edging system of a spectacle lens according to claim 9, wherein the edging control terminal is configured to output a command signal to give an instruction to calculate the edging shape data by the first calculating section when lens design data of a spectacle lens to be edged cannot be acquired, and give an instruction to calculate the edging shape data by the second calculating section when the lens design data can be acquired.

11. The edging system of a spectacle lens according to claim 9, wherein the edging control terminal is configured to output a command signal to give an instruction to calculate the edging shape data by the first calculating section when a surface shape of a spectacle lens to be edged is a spherical surface, and give an instruction to calculate the edging shape data by the second calculating section when the surface shape of the spectacle lens is the shape other than the spherical surface.

12. The edging system of a spectacle lens according to claim 9, wherein the edging control terminal is configured to output a command signal to give an instruction to calculate the edging shape data by the first calculating section when a tilt angle of a spectacle frame in which a lens is settled, is less than a specific angle, and give an instruction to calculate the edging shape data by the second calculating section when a tilt angle of the spectacle frame is the specific angle or more.

13. A method for manufacturing a spectacle lens, using a lens edger having a lens edging section that edges a spectacle lens so as to be settled in a spectacle frame, and a first calculating section that obtains edging shape data used for edging the lens by the lens edging section, based on a first calculation program; and an edging control terminal having a second calculating section that obtains edging shape data used for edging the lens by the lens edging section, based on a second calculation program different from the first calculation program, the method including:

switching a setting of a calculating section so as to select either one of the first calculating section and the second calculating section for calculating edging shape data used for at least the edging of the lens in each kind of calculation items regarding the edging by the lens edger;

calculating the edging shape data by the second calculating section when the setting of the calculating section is switched in the step of switching the setting so as to select the second calculating section for calculating the edging shape data; and edging the spectacle lens by the lens edging section of the lens edger using the edging shape data calculated by the second calculating section in the step of calculating the edging shape data.

14. A lens edger communicably connected to an edging control terminal having a second calculating section for obtaining edging shape data used for edging, based on a second program, and configured to edge a spectacle lens so as to be settled in a spectacle frame, the lens edger comprising:

a lens edging section configured to perform the edging;

a first calculating section configured to obtain edging shape data used for the edging by the lens edging section, based on a first calculation program different from the second calculation program;

a calculation switching section configured to switch a setting of a calculating section so as to select either one of the first calculating section and the second calculating section for calculating the edging shape data used for at least the edging in each kind of calculation items regarding the edging;

a data acquisition section configured to acquire the edging shape data calculated by the second calculating section when the edging shape data is calculated by the second calculating section; and an edging control section configured to control the lens edging section to perform edging, using the edging shape data acquired by the data acquisition section when the calculation switching section switches the setting of the calculating section so as to select the second calculating section for calculating the edging shape data.

* * * * *